(12) United States Patent
Tsuda et al.

(10) Patent No.: US 11,810,451 B2
(45) Date of Patent: Nov. 7, 2023

(54) DEVICE CONTROL SIGNAL REGISTRATION APPARATUS, DEVICE CONTROL SIGNAL REGISTRATION SYSTEM, DEVICE CONTROL SIGNAL REGISTRATION METHOD, AND DEVICE CONTROL SIGNAL REGISTRATION PROGRAM STORING MEDIUM

(71) Applicant: Mitsubishi Electric Corporation, Tokyo (JP)

(72) Inventors: Yuka Tsuda, Tokyo (JP); Masayuki Kirimura, Tokyo (JP); Daisuke Nakamura, Tokyo (JP); Takaki Yagisawa, Tokyo (JP); Takumi Akiyama, Tokyo (JP); Mio Nishiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 385 days.

(21) Appl. No.: 16/951,568

(22) Filed: Nov. 18, 2020

(65) Prior Publication Data

US 2021/0090431 A1  Mar. 25, 2021

Related U.S. Application Data

(63) Continuation of application No. PCT/JP2018/023677, filed on Jun. 21, 2018.

(51) Int. Cl.
*G05B 19/02* (2006.01)
*G08C 19/16* (2006.01)
(Continued)

(52) U.S. Cl.
CPC ............ *G08C 19/16* (2013.01); *H04W 60/04* (2013.01); *G08C 23/04* (2013.01); *G08C 2201/21* (2013.01); *G08C 2201/31* (2013.01)

(58) Field of Classification Search
CPC ..... G08C 19/16; G08C 23/04; G08C 2201/21; G08C 2201/31; H04W 60/04
(Continued)

(56) References Cited

U.S. PATENT DOCUMENTS

2008/0231761 A1* 9/2008 Nishikata ............... G08C 23/04
  348/734
2012/0079387 A1* 3/2012 Agnihotri ........... H04L 12/2818
  715/733
(Continued)

FOREIGN PATENT DOCUMENTS

JP  2002-374584 A  12/2002
JP  2007-306096 A  11/2007
(Continued)

OTHER PUBLICATIONS

Chinese Office Action dated Mar. 31, 2023 issued in corresponding Chinese Patent Application No. 201880094604.3 with an English Translation.

*Primary Examiner* — Naomi J Small
(74) *Attorney, Agent, or Firm* — Birch, Stewart, Kolasch & Birch, LLP

(57) ABSTRACT

Included are: a list acquiring unit for acquiring a device list that lists models of a device having functions that can be controlled by operation of a remote controller; a model receiving unit for receiving information of a target model of a target device, of which device control signal generated by operation of the remote controller is to be registered, the target model of the target device selected on the basis of the device list acquired by the list acquiring unit; a function determination unit for determining one or more target functions of the target model received by the model receiving unit; and a guidance generation unit for generating guidance information indicating operation of the remote controller for (Continued)

executing the one or more target functions determined by the function determination unit.

20 Claims, 21 Drawing Sheets

(51) Int. Cl.
*H04W 60/04* (2009.01)
*G08C 23/04* (2006.01)

(58) Field of Classification Search
USPC .......................................... 340/4.31
See application file for complete search history.

(56) References Cited

U.S. PATENT DOCUMENTS

| 2015/0212500 | A1* | 7/2015 | Akabane | ............... | G05D 1/0044 |
| | | | | | 700/275 |
| 2016/0021546 | A1* | 1/2016 | Cuervo | ................ | H04W 40/24 |
| | | | | | 370/254 |

FOREIGN PATENT DOCUMENTS

| JP | 2012-199997 A | 10/2012 |
| JP | 2015-46736 A | 3/2015 |

* cited by examiner

FIG. 3

| Function | Content of Speech Output |
|---|---|
| Power On | Press the red round button printed with Off/On on the remote controller. If the air conditioner beeps and the louver starts to move, the remote control signal is successfully sent. If the louver does not move, press the button again. |
| Power Off | Press the red round button printed with Off/On on the remote controller. If the air conditioner beeps and the louver starts to move, the remote control signal is successfully sent. If the louver does not move, press the button again. |
| Increase Set Temperature by One Degree | Check the number displayed on the liquid crystal screen of the remote controller and press once the upward triangle button on the right side of the remote controller. If the number on the liquid crystal screen of the remote controller is increased by one, the remote control signal is successfully sent. In other cases, press the button again. |
| Reduce Set Temperature by One Degree | Check the number displayed on the liquid crystal screen of the remote controller and press once the downward triangle button on the right side of the remote controller. If the number on the liquid crystal screen of the remote controller is reduced by one, the remote control signal is successfully sent. In other cases, press the button again. |
| ... | ... |

| Device Name | Model Name | | Name of Button | Pronunciation | Displayed Name | Device Control Signal | Number of Registered |
|---|---|---|---|---|---|---|---|
| | Name of Manufacturer | Product Type | | | | | |
| Television | A Corp. | ZG-40ZW | Power | Paw Uh | Power | AB 0C | 5678 |
| Television | A Corp. | ZG-40ZW | 1 | Wuhn | 1 | AB 01 | 132 |
| Television | A Corp. | ZG-40ZW | 2 | Too | 2 | AB 02 | 49 |
| ... | ... | ... | ... | ... | ... | ... | ... |
| Television | A Corp. | ZG-40ZW | Volume + | Vol Yume Up | Volume Up | AB 0A | 66 |
| Television | A Corp. | ZG-40ZW | Volume − | Vol Yume Dawn | Volume Down | AB 0B | 207 |
| ... | ... | ... | ... | ... | ... | ... | ... |

FIG. 10

| Function | Content of Speech Output |
|---|---|
| Power On | Press the red round button printed with Off/On on the remote controller.<br>(If Notification Has Been Made by Event Reception Notifying Unit) The remote control signal has been sent.<br>(If No Notification Is Made by Event Reception Notifying Unit) Press the button again. |
| Power Off | Press the red round button printed with Off/On on the remote controller.<br>(If Notification Has Been Made by Event Reception Notifying Unit) The remote control signal has been sent.<br>(If No Notification Is Made by Event Reception Notifying Unit) Press the button again. |
| Increase Set Temperature by One Degree | Check the number displayed on the liquid crystal screen of the remote controller and press once the upward triangle button on the right side of the remote controller.<br>(If Notification Has Been Made by Event Reception Notifying Unit) The remote control signal has been sent.<br>(If No Notification Is Made by Event Reception Notifying Unit) Press the button again. |
| Reduce Set Temperature by One Degree | Check the number displayed on the liquid crystal screen of the remote controller and press once the downward triangle button on the right side of the remote controller.<br>(If Notification Has Been Made by Event Reception Notifying Unit) The remote control signal has been sent.<br>(If No Notification Is Made by Event Reception Notifying Unit) Press the button again. |
| ... | ... |

1001

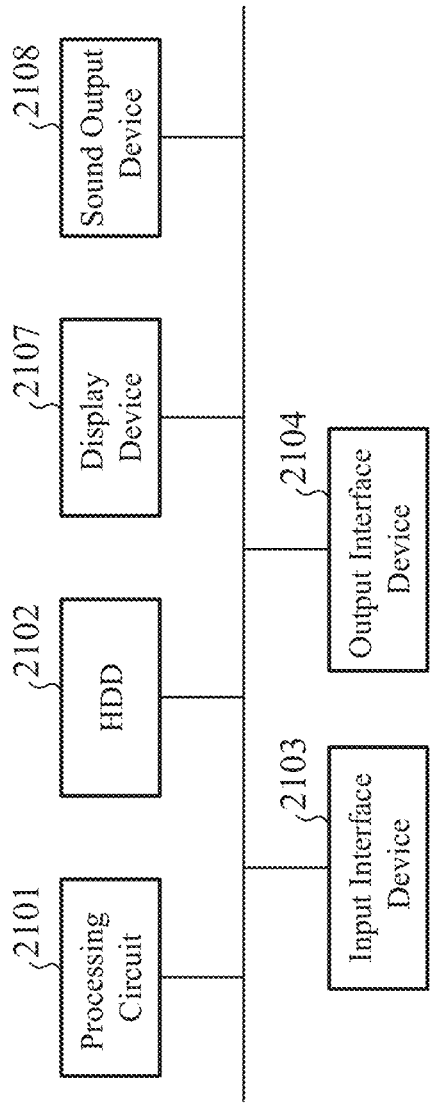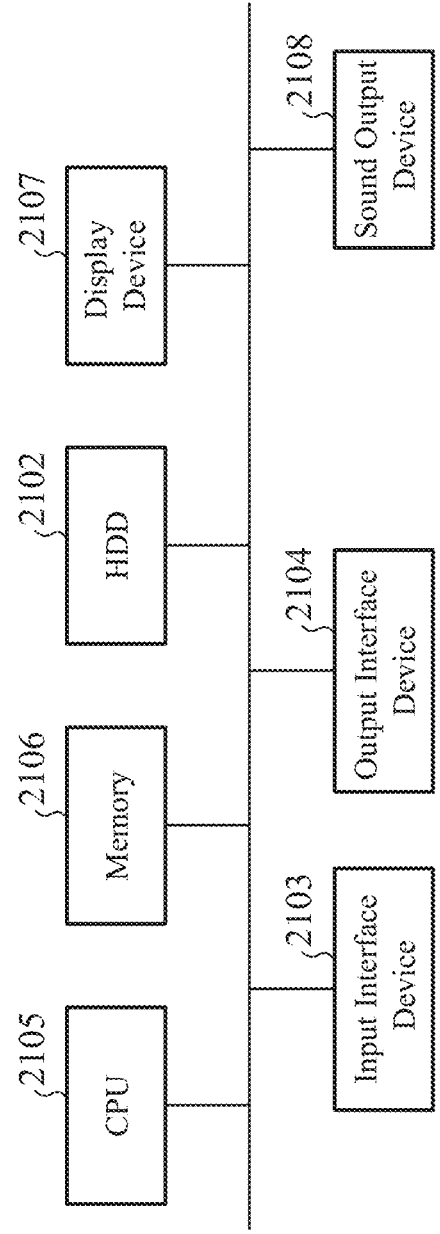

DEVICE CONTROL SIGNAL REGISTRATION APPARATUS, DEVICE CONTROL SIGNAL REGISTRATION SYSTEM, DEVICE CONTROL SIGNAL REGISTRATION METHOD, AND DEVICE CONTROL SIGNAL REGISTRATION PROGRAM STORING MEDIUM

CROSS-REFERENCE TO RELATED APPLICATIONS

This application is a Continuation of PCT International Application No. PCT/JP2018/023677, filed on Jun. 21, 2018, all of which is hereby expressly incorporated by reference into the present application.

TECHNICAL FIELD

The present invention relates to a device control signal registration apparatus for registering a device control signal for controlling a device.

BACKGROUND ART

A remote controller generates a control signal (hereinafter, referred to as "device control signal") when a user operates the remote controller to cause a device to execute a function of the device. In the related art, there is known technology for collecting device control signals generated by remote controllers for one or more types of devices and registering the collected signals in a server.

For example, Patent Literature 1 discloses, as technology for an unspecified large number of people to register remote controller codes in a server, a remote controller code server system including: a remote controller code server that allows an unspecified large number of people connected to the Internet to register remote controller codes; an input means for allowing a user accessing the server to input a remote controller code, a model name, or a function name; and an accumulation means for accumulating the input remote controller codes, model names, and function names in association with each other. The "remote controller code" in Patent Literature 1 corresponds to the "device control signal".

CITATION LIST

Patent Literature

Patent Literature 1: JP 2007-306096 A

SUMMARY OF INVENTION

Technical Problem

In the conventional technology represented by the technology of the remote controller code server system as disclosed in Patent Literature 1, a user needs to input the model name of a device when the user registers a device control signal for controlling the device which is not registered in the remote controller code server. In a case where the user inputs a model name manually, the user cannot easily register a control signal since it takes time to input the model name. Therefore, as a result, there is a disadvantage that it is difficult for the remote controller code server to collect device control information.

The present invention has been made to solve the above-described disadvantage, and an object of the invention is to provide a device control signal registration apparatus that does not require manual input of a model name for registration of a device control signal.

Solution to Problem

A device control signal registration apparatus according to the present invention includes: processing circuitry performing a process of: acquiring a device list that lists models of a device having functions that can be controlled by operation of a remote controller; receiving information of a target model of a target device, of which device control signal generated by operation of the remote controller is to be registered, the target model of the target device selected on a basis of the device list acquired; determining one or more target functions of the target device indicated by the information of the target model; and generating guidance information indicating operation of the remote controller for executing the one or more target functions determined.

Advantageous Effects of Invention

According to the present invention, it is possible to provide a device control signal registration apparatus that does not require manual input of a model name for registration of a device control signal.

BRIEF DESCRIPTION OF DRAWINGS

FIG. 3 is a diagram illustrating a concept of an example of speech content that is output speech by a speech output unit under the control by the output control unit in the first embodiment.

FIG. 4 is a diagram illustrating an example of information stored in a device control signal DB in the first embodiment.

FIG. 10 is a diagram illustrating an example of the content that the output control unit has caused the speech output unit to output guidance information by speech in response to an event reception notification in the first embodiment.

FIGS. 21A and FIG. 21B are diagrams illustrating exemplary hardware configurations of the device control signal registration apparatus and the device control signal collecting device according to the first to fourth embodiments.

FIG. 22A is a diagram illustrating a concept of the business model in a case where an individual manages the device control signal registration system, and FIG. 22B is a diagram illustrating a concept of the business model in a case where a company manages the device control signal registration system.

DESCRIPTION OF EMBODIMENTS

To describe the present invention further in detail, embodiments for carrying out the present invention will be described below by referring to the accompanying drawings.

First Embodiment

Figure 1:
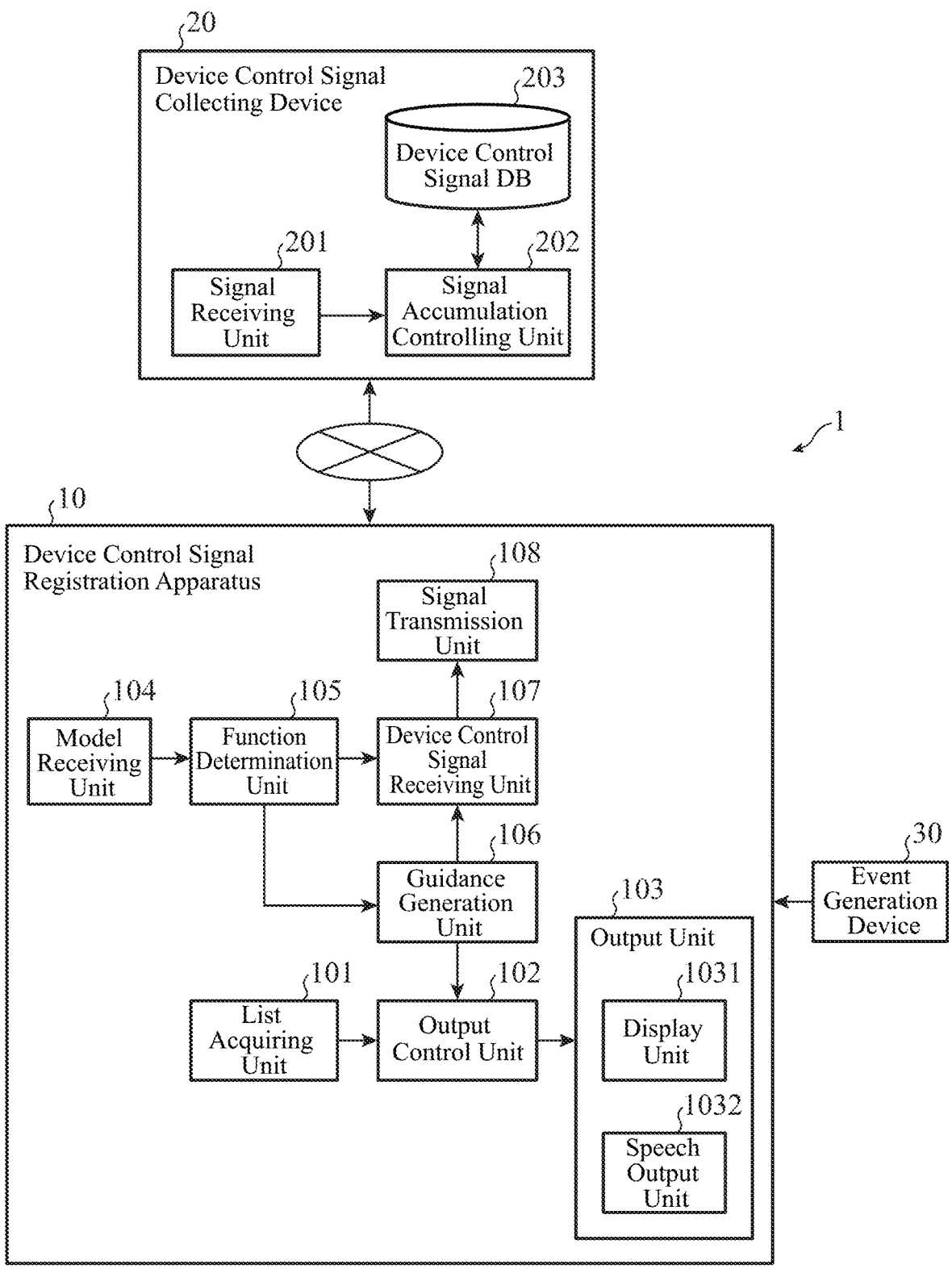
FIG. 1 is a diagram illustrating a configuration example of a device control signal registration system according to a first embodiment.

FIG. 1 is a diagram illustrating a configuration example of a device control signal registration system 1 according to a first embodiment.

The device control signal registration system 1 includes a device control signal registration apparatus 10, a device control signal collecting device 20, and an event generation device 30.

The device control signal registration apparatus 10 and the device control signal collecting device 20 are connected via a network. Furthermore, the device control signal registration apparatus 10 and the event generation device 30 are connected via a network.

The device control signal registration apparatus 10 is, for example, a mobile terminal (not illustrated) such as a smartphone or a tablet.

The device control signal registration system 1 collects, for example, device control signals generated as a result of a user operating a remote controller in order to cause a device to execute a function of the device, and stores the device control signals in an accumulation unit (device control signal data base (DB) 203 (described later)).

In the first embodiment, a "device" refers to one or more home electrical appliances installed in a home, such as an air conditioner or a television.

Specifically, first, the device control signal registration apparatus 10 acquires a device list.

A device list is a list of models of a device having functions that can be controlled by a user by operation of a remote controller. In a device list, one or more models are listed. Note that, in the first embodiment, information of a device model includes information of the manufacturer and the type of the product.

Recognizing devices connected to a home LAN environment and acquiring a list of devices is commonly known general technology. For example, in a home LAN, it is possible to recognize the model of a device connected to the home LAN by analyzing the product code using a communication protocol capable of communicating the product code. Examples of communication protocols capable of communicating a product code includes ECHONET Lite (registered trademark), KNX (registered trademark), or SEP2.0. The device control signal registration apparatus 10 acquires a list obtained by the general technology as a device list.

Furthermore, for example, in a case where the user has an application for integrally managing devices installed in a house in a mobile terminal, the application generates a device list. The device control signal registration apparatus 10 may acquire the device list generated by the application.

After acquiring the device list, the device control signal registration apparatus 10 causes the device list to be displayed, and allows the user to select one or more models from the models included in the device list.

The models the user selects here are models (hereinafter, referred to as "target models") of a device to be controlled (hereinafter, referred to as "target device") by a device control signal generated by a remote controller by the user operating the remote controller after this selection.

The device control signal registration apparatus 10 determines a function to be executed (hereinafter, referred to as "target function") by the target device by the user operating the remote controller on the basis of the target model selected by the user, and provides a guidance to the user on the operation of the remote controller for causing the device to execute the determined target function.

The user operates the remote controller in accordance with the guidance, and the device control signal registration apparatus 10 receives the device control signal generated as a result of the user operating the remote controller, and transmits the device control signal to the device control signal collecting device 20.

In this manner, the device control signal registration apparatus 10 acquires the generated device list and presents the device model to the user using the acquired device list. Therefore, it is not necessary to manually input the model name to which the device control signal correspond when the user operates the remote controller to accumulate a device control signal.

The device control signal collecting device 20 receives the device control signal transmitted from the device control signal registration apparatus 10 and stores the device control signal in the device control signal DB 203. The device control signal DB 203 can allow, for example, device control information made public and accumulated in the device control signal DB 203 to be used in various companies.

The event generation device 30 is, for example, an infrared remote controller. Hereinafter, the event generation device 30 will be described as the "remote controller".

As illustrated in FIG. 1, the device control signal registration apparatus 10 includes a list acquiring unit 101, an output control unit 102, an output unit 103, a model receiving unit 104, a function determination unit 105, a guidance generation unit 106, a device control signal receiving unit 107, and a signal transmission unit 108.

The output unit 103 includes a display unit 1031 and a speech output unit 1032.

The display unit 1031 is a display device such as a display. The speech output unit 1032 is a speech output device such as a speaker. In the first embodiment, as an example, it is assumed that display unit 1031 and speech output unit 1032 are a touch-panel display included in a mobile terminal and a speaker included in the mobile terminal, respectively.

The list acquiring unit 101 acquires a device list.

The list acquiring unit 101 outputs the acquired device list to the output control unit 102.

The output control unit 102 controls the output unit 103 and causes the output unit 103 to output various types of information.

For example, the output control unit 102 controls the display unit 1031 of the output unit 103, and causes the display unit 1031 to display the device list output from the list acquiring unit 101. The user can confirm the displayed device list and select a target model. Specifically, for example, the user can select a target model by touching the display unit 1031. Note that the user can select one or more models as target models from the models listed in the device list.

Furthermore, for example, the output control unit 102 controls the display unit 1031 of the output unit 103, and causes the display unit 1031 to display guidance information using an image generated by the guidance generation unit 106 (described later). Furthermore, for example, the output control unit 102 controls the speech output unit 1032 of the output unit 103, and causes the speech output unit 1032 to output speech of the guidance information using a speech generated by the guidance generation unit 106. The user operates the remote controller in accordance with the displayed guidance or the guidance output by speech.

When the user selects a target model on the basis of the device list displayed by the output control unit 102, the model receiving unit 104 receives information of the target model selected by the user.

The model receiving unit 104 outputs the information of the received target model to the function determination unit 105. At this point, the model receiving unit 104 outputs the information of the target device to the function determination unit 105 in association with the information of the target model. The information of the target device may be any information as long as the device can be specified.

The function determination unit 105 determines one or more target functions among the functions of the target model received by the model receiving unit 104.

One of the following methods is conceivable as an exemplary method for the function determination unit 105 to determine the target function.

As a first method, the function determination unit 105 determines a target function on the basis of "general function information" stored in advance in a place that can be referenced by the device control signal registration apparatus 10.

In general function information, generally installed functions are defined for each device in association with each other.

The function determination unit 105 sets functions defined in association with the target device as target functions on the basis of the general function information.

As a second method, the function determination unit 105 searches for functions of the target device via the Internet and determines the target functions.

The function determination unit 105 determines, as target functions, functions retrieved as those of the target device.

In the first embodiment, in a case where there are multiple functions defined in association with the target device, the function determination unit 105 determines all the functions as target functions. In a case where there are multiple target functions, the function determination unit 105 may determine the rank of the target functions and assigns the rank to the target functions. The function determination unit 105 may determine the rank of the target functions by any appropriate method. For example, the function determination unit 105 assigns the rank in accordance with predetermined priorities. As a specific example, for example, the function determination unit 105 assigns the rank from the upper left to the lower right in the remote controller in accordance with the arrangement order of the buttons operated for execution of the target functions.

The function determination unit 105 outputs information of the determined target functions to the device control signal receiving unit 107 and the guidance generation unit 106. At this point, the function determination unit 105 also outputs information of the target device to the device control signal receiving unit 107 and the guidance generation unit 106. The information of the target functions may be any information that can specify the functions.

In the first embodiment, the information of the target functions and the information of the target device are the function names and the device name, respectively. Note that this is merely an example, and the function determination unit 105 is only required to output information for specifying the target functions as information of the target functions.

Moreover, the function determination unit 105 is only required to output information for specifying the target device as information of the target device.

The guidance generation unit 106 generates guidance information indicating the operation of the remote controller for causing the target device to execute the target functions on the basis of the information of the target functions output from the function determination unit 105.

For each model of the device, "function execution operation information", in which the functions of the model is executed by which operation of the remote controller is defined, is stored in advance in a place where the device control signal registration apparatus 10 can refer to. The guidance generation unit 106 generates guidance information on the basis of the function execution operation information.

Specifically, it is assumed, for example, that the target device is an "air conditioner", that the target model is "ABC-1234" manufactured by "Y Corp.", and that the target function is to "turn on the power".

It is assumed that the operation of "pressing the red round button printed with Off/On on the remote controller" is defined for the function of "turning on the power" in the function execution operation information.

In this case, the guidance generation unit 106 generates guidance information indicating the operation of pressing the red round button that is printed with Off/On.

As described above, the guidance information indicates, to a user, the operation of the remote controller for executing a target function, and the device control signal registration system 1 collects device control signals generated by the user operating the remote controller in accordance with the guidance information. Therefore, it is desirable that the user securely executes the target function by operating the remote controller.

Therefore, in addition to the specific operation, the guidance generation unit 106 may include, in the guidance information, information for guiding the user until the target function is securely executed by the operation. For example, the guidance generation unit 106 includes, in the guidance information, information for guiding the user to repeat the operation until the air conditioner beeps and the louver starts to move as a result of pressing the red round button printed with "Off/On". As described above, in the first embodiment, the guidance generation unit 106 includes, in the guidance information, information for guiding the user until the target function is securely executed by operation.

The guidance generation unit 106 outputs the generated guidance information to the output control unit 102. Note that the guidance generation unit 106 also adds information of the target function name and the target device name output from the function determination unit 105 to the guidance information.

Note that, in a case where there are multiple target functions, the guidance generation unit 106 sequentially generates guidance information indicating the operation of the remote controller, for example, in accordance with the rank given to the target functions.

The output control unit 102 controls the display unit 1031 to causes the display unit 1031 to display the guidance information output from the guidance generation unit 106. Alternatively, the output control unit 102 controls the speech output unit 1032, and causes the speech output unit 1032 to output, by speech, the guidance information output from the guidance generation unit 106. The output control unit 102 may cause the display unit 1031 to display the guidance information and also cause the speech output unit 1032 to execute speech output of the guidance information.

Figure 2:
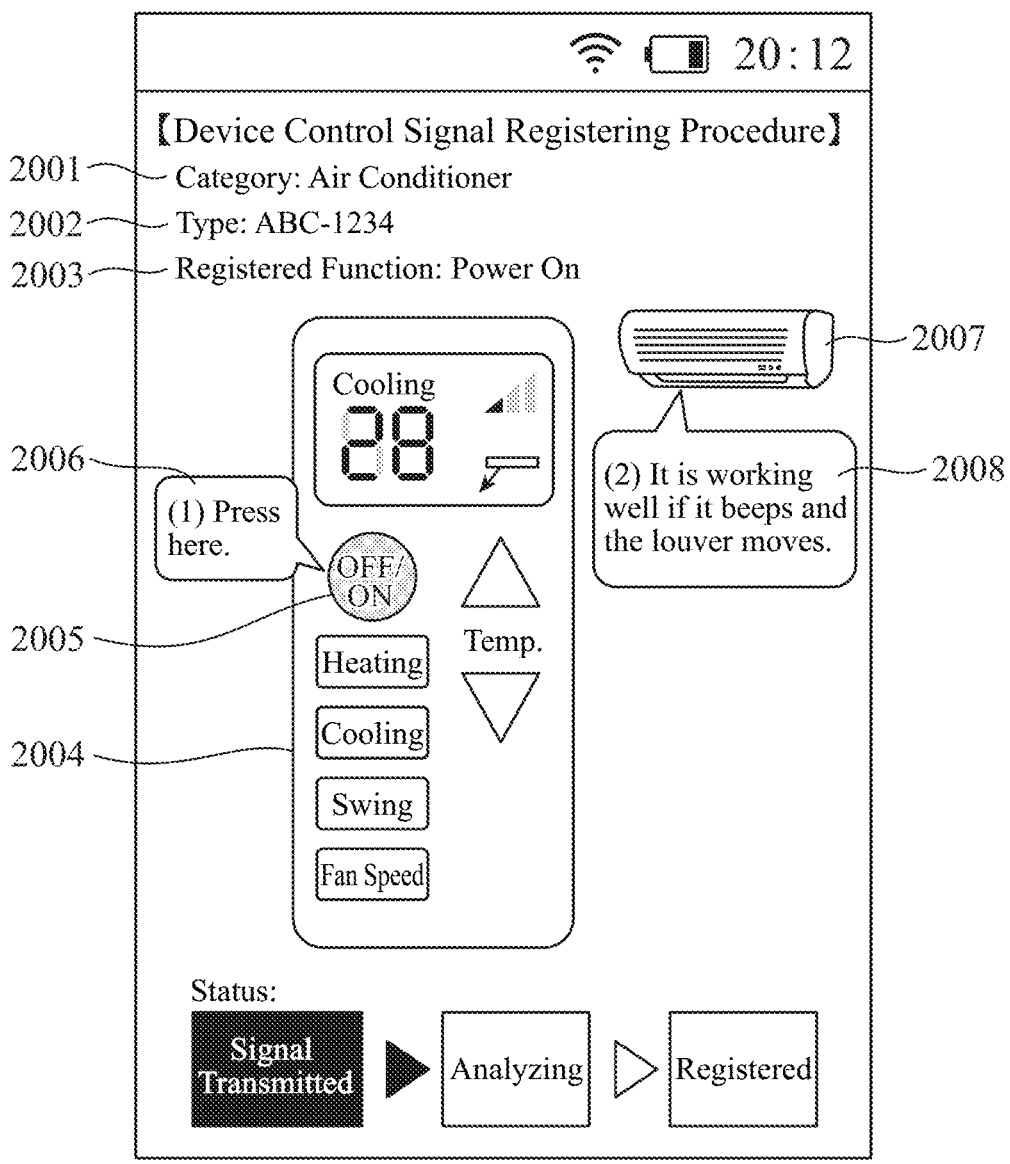
FIG. 2 is a diagram illustrating a concept of an example of a screen on which a display unit displays guidance information on the basis of control by an output control unit in the first embodiment.

Here, FIG. 2 is a diagram illustrating a concept of an exemplary screen on which the display unit 1031 displays guidance information on the basis of the control by the output control unit 102 in the first embodiment.

Note that it is illustrated in FIG. 2 that in a case where the function of "turning on the power" of the "air conditioner" of type "ABC-1234" manufactured by "Y Corp." is the target function, guidance information is displayed which indicates the operation of "pressing the red round button printed with Off/On on the remote controller" that is gen-erated by the guidance generation unit 106. For convenience of explanation, in FIG. 2, the colors and the like of the buttons of the remote controller are indicated with different background patterns.

The display unit 1031 displays a target device name (see 2001 in FIG. 2), a target model name (see 2002 in FIG. 2), and a target function name (see 2003 in FIG. 2) on the basis of the guidance information. Function names are determined in advance in correspondence to each function. Note that, in FIG. 2, the type name of the product is displayed as the model name.

In addition, the display unit 1031 displays information for guiding the operation of pressing the red round button that is printed with Off/On on the basis of the guidance information. For example, as illustrated in FIG. 2, the display unit 1031 displays a concept of the remote controller (see 2004 in FIG. 2), and displays the operation content on the image of the remote controller with respect to the button to be operated (here, "Off/On" button) by the user (see 2005 in FIG. 2). Specifically, the display unit 1031 displays a speech bubble pointing the image of the Off/On button, and further displays a message "Press here" in the speech bubble (see 2006 in FIG. 2).

The display unit 1031 continues to display, to the user, the information for guiding the user on the basis of the guidance information until the function of "turning on the power" of the "air conditioner" is securely executed. For example, the display unit 1031 displays an image of the "air conditioner" that is the target device to be operated by the remote controller (see 2007 in FIG. 2), displays a speech bubble pointing the image of the air conditioner, and displays a message "It is working well if it beeps and the louver moves" in the speech bubble (see 2008 in FIG. 2).

The output control unit 102 may cause the display unit 1031 to display guidance information so that the order of information to be confirmed by the user is clear. Specifically, the user needs to confirm "Press here" before confirming "It is working well if it beeps and the louver moves". Therefore, for example, as illustrated in FIG. 2, the display unit 1031 displays information indicating the order of confirmation such as "(1)" placed before "Press here", and "(2)" placed before "It is working well if it beeps and the louver moves".

In addition, for example, in the example illustrated in FIG. 2, in a case where there are multiple target functions, such as "turning on the power" of the "air conditioner" and "turning on the heating" of the "air conditioner", there are multiple operations to be performed by the user. Note that the order of operations to be performed by the user is such that the operation for "turning on the power" is performed, and then the operation for "turning on the heating" is performed.

In this case, the output control unit 102 causes the display unit 1031 to display information indicating the order of operations of the remote controller indicated by the guidance information. Specifically, for example, in a case where the operations of the remote controller indicated by the guidance information includes the operation of pressing the "Heating" button after the operation of pressing the "Off/On" button, the output control unit 102 displays a message "(3) Press here" in a speech bubble for the "Heating" button.

Note that the screen image illustrated in FIG. 2 is merely one example. The output control unit 102 is only required to cause the display unit 1031 to display at least information for guiding operations to be sequentially performed by the user and information that guides the user until the target function to be executed by the operations is securely executed.

FIG. 3 is a diagram illustrating a concept of an example of speech content that is output speech by the speech output unit 1032 under the control by the output control unit 102 in the first embodiment.

Note that the concept of the speech output content denoted by 3001 in FIG. 3 corresponds to the concept of the speech output content that is output on the basis of the guidance information generated by the guidance generation unit 106 in a case where the function of "turning on the power" of the "air conditioner" of type "ABC-1234" manufactured by "Y Corp." is the target function.

As illustrated in FIG. 3, the speech output unit 1032 outputs, on the basis of the guidance information, an operation to be performed by the user and a speech guidance for guiding the user until the target function to be executed by the operation is securely executed.

Note that the concept of the speech output content illustrated in FIG. 3 is merely an example. The output control unit 102 is only required to cause the speech output unit 1032 to output a speech that can guide operations to be sequentially performed by the user and a speech that can guide the user until the target function to be executed by the operations is securely executed.

The user operates the remote controller in accordance with the screen displayed by the display unit 1031 or the speech output by the speech output unit 1032.

Let us return to the explanation of FIG. 1.

The guidance generation unit 106 outputs, to the device control signal receiving unit 107, information of a "button name" of the remote controller to be operated by the user, "pronunciation" when the button name is read out, and the "displayed name" when the button name is displayed on the basis of the generated guidance information. A "button name", "pronunciation", and a "displayed name" are predetermined for each button of the remote controller.

In the above-described example in which the function of "turning on the power" of the "air conditioner" of type "ABC-1234" manufactured by "Y Corp." is the target function, the guidance generation unit 106 outputs the information of the button name "power", pronunciation "paw uh", and the displayed name "power" to the device control signal receiving unit 107.

The device control signal receiving unit 107 receives a device control signal generated as a result of operation of the remote controller on the basis of the guidance information generated by the guidance generation unit 106. Incidentally, a device control signal generated and transmitted by the remote controller is usually an analog signal, whereas the device control signal is treated as a digital signal in processing in the device control signal registration apparatus 10. Therefore, the device control signal receiving unit 107 converts an analog device control signal into a digital signal when receiving the analog device control signal from the remote controller and receives the digital signal.

The device control signal receiving unit 107 outputs the received device control signal to the signal transmission unit 108. At this point, the device control signal receiving unit 107 outputs, to the signal transmission unit 108, the device name and the function name output from the function determination unit 105 and the information of the button name, pronunciation, and the displayed name output from the guidance generation unit 106 together with the device control signal.

When the device control signal receiving unit 107 receives the device control signal transmitted from the remote controller, the device control signal receiving unit 107 may determine whether or not the received device control signal has been generated as a result of the user performing the operations based on the display or a speech output on the basis of the guidance information generated by the guidance generation unit 106. In this case, if the device control signal receiving unit 107 determines that the device control signal is not a device control signal generated as a result of performing the operations based on the display or a speech output on the basis of the guidance information, the device control signal is discarded.

The device control signal receiving unit 107 is only required to determine whether or not to receive the device control signal transmitted from the remote controller based on the date and time when the guidance generation unit 106 has generated the guidance information. Specifically, for example, the device control signal receiving unit 107 determines whether or not the device control signal corresponds to the guidance information depending on whether or not the date and time when the device control signal has been transmitted from the remote controller matches the date and time when the guidance generation unit 106 has generated the guidance information. The device control signal receiving unit 107 discards a device control signal of which transmission date and time does not match the generation date and time of the guidance information among the received device control signals.

Alternatively, for example, the device control signal receiving unit 107 may validate guidance information that is received during a certain period of time after the guidance information has been output, and may discard guidance information that is not received during a certain period of time after the guidance information has been output.

Note that the device control signal receiving unit 107 is only required to acquire information of the date and time of generation of guidance information from the guidance generation unit 106. In addition, the device control signal receiving unit 107 is only required to set the date and time when guidance information is output as, for example, the date and time of generation of the guidance information.

The signal transmission unit 108 transmits the device control signal received by the device control signal receiving unit 107 to the device control signal collecting device 20.

Note that, although the output unit 103 is included in the device control signal registration apparatus 10 as illustrated in FIG. 1 in the first embodiment, this is merely an example. The output unit 103 may be provided outside the device control signal registration apparatus 10 at a place where the output unit 103 can communicate with the device control signal registration apparatus 10.

As illustrated in FIG. 1, the device control signal collecting device 20 includes a signal receiving unit 201, a signal accumulation controlling unit 202, and the device control signal DB 203.

The signal receiving unit 201 receives a device control signal transmitted from the signal transmission unit 108 of the device control signal registration apparatus 10.

The signal receiving unit 201 outputs the received device control signal to the signal accumulation controlling unit 202.

The signal accumulation controlling unit 202 stores the device control signal received by the signal receiving unit 201 in the device control signal DB 203 in association with information of the target device and the target model.

The signal accumulation controlling unit 202 determines whether or not the device control signal received by the signal receiving unit 201 has already been stored in the device control signal DB 203, and in a case where it is determined that the device control signal is stored, then, information of the total number of accumulated device control signals is updated together with the device control signal.

The device control signal DB 203 stores information of the device control signal on the basis of the control by the signal accumulation controlling unit 202.

FIG. 4 is a diagram illustrating an example of information accumulated in the device control signal DB 203 in the first embodiment.

As illustrated in FIG. 4, the device control signal DB 203 stores information of a device name, a manufacturer name, a product type, a button name, pronunciation, a displayed name, a device control signal, and the number of registered device control signals in association with each other. The manufacturer name and the product type are included in the model name.

Note that, although the device control signal DB 203 is included in the device control signal collecting device 20 as illustrated in FIG. 1 in the first embodiment, this is merely an example. The device control signal DB 203 may be provided outside the device control signal collecting device 20 at a place where the device control signal collecting device 20 can refer.

The operations of the device control signal registration apparatus 10 and the device control signal collecting device 20 in the device control signal registration system 1 according to the first embodiment will be described.

Figure 5:
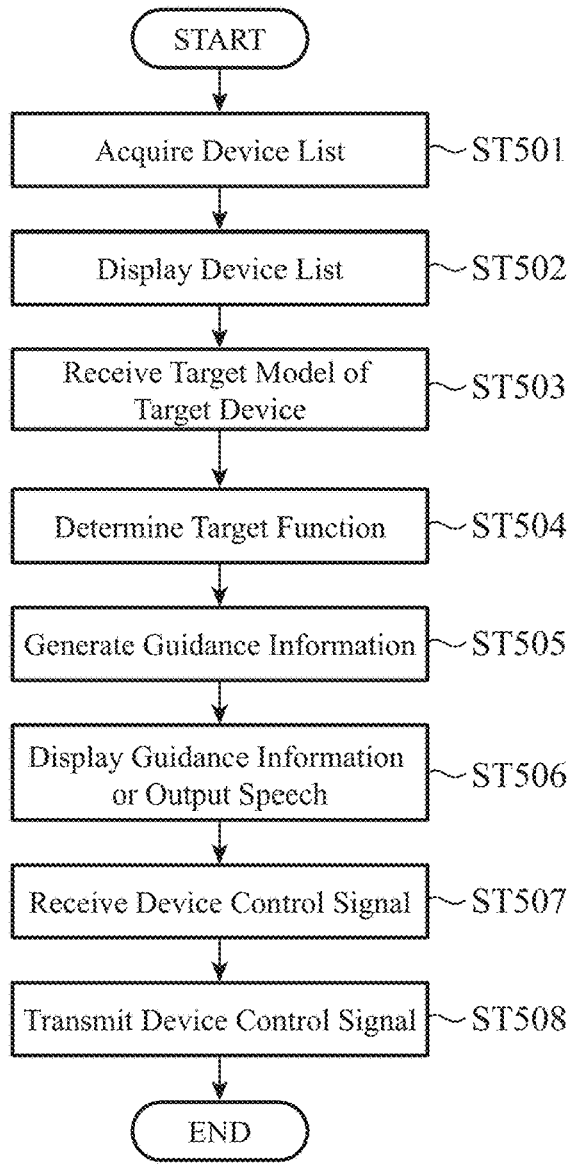
FIG. 5 is a flowchart for explaining the operation of the device control signal registration apparatus according to the first embodiment.

FIG. 5 is a flowchart for explaining the operation of the device control signal registration apparatus 10 according to the first embodiment.

The operations in FIG. 5 described below are performed, for example, on the basis of a registration start instruction from a user. Specifically, for example, a user inputs a registration start instruction by touching a "device control information registration" button displayed on the display unit 1031. An instruction receiving unit (not illustrated) of the device control signal registration apparatus 10 receives the input registration start instruction. When the instruction receiving unit receives the registration start instruction, the operations described below are performed.

The list acquiring unit 101 acquires a device list (step ST501).

The list acquiring unit 101 outputs the acquired device list to the output control unit 102.

The output control unit 102 causes the display unit 1031 of the output unit 103 to display the device list output from the list acquiring unit 101 in step ST501 (step ST502). The user confirms the displayed device list and selects the target model of the target device.

When the user selects the target model of the target device on the basis of the device list displayed by the output control unit 102 in step ST502, the model receiving unit 104 receives the target model of the target device selected by the user (step ST503).

The model receiving unit 104 outputs the information of the received target model to the function determination unit 105.

The function determination unit 105 determines one or more target functions among the functions of the target model received by the model receiving unit 104 in step ST503 (step ST504).

The function determination unit 105 outputs information of the determined target functions to the device control signal receiving unit 107 and the guidance generation unit 106.

The guidance generation unit 106 generates guidance information indicating the operation of the remote controller for causing the target device to execute the target functions on the basis of the information of the target functions output from the function determination unit 105 in step ST504 (step ST505).

The guidance generation unit 106 outputs the generated guidance information to the output control unit 102. The guidance generation unit 106 also outputs, to the device control signal receiving unit 107, information of a "button name" of the remote controller to be operated by the user, "pronunciation" when the button name is read out, and the "displayed name" when the button name is displayed on the basis of the generated guidance information.

The output control unit 102 causes the display unit 1031 to display the guidance information output from the guidance generation unit 106 in step ST505. Alternatively, the output control unit 102 causes the speech output unit 1032 to output, by speech, the guidance information output from the guidance generation unit 106 (step ST506, see FIGS. 2 and 3).

The user operates the remote controller in accordance with the screen displayed by the display unit 1031 or the speech output by the speech output unit 1032 in step ST506.

The device control signal receiving unit 107 receives a device control signal generated as a result of operation of the remote controller on the basis of the guidance information generated by the guidance generation unit 106 in step ST505 (step ST507).

The device control signal receiving unit 107 outputs the received device control signal to the signal transmission unit 108.

In step ST507, the device control signal receiving unit 107 may determine whether or not the received device control signal has been generated as a result of the user performing the operations based on the display or a speech output on the basis of the guidance information generated by the guidance generation unit 106.

The signal transmission unit 108 transmits the device control signal received by the device control signal receiving unit 107 in step ST507 to the device control signal collecting device 20 (step ST508).

As described above, the device control signal registration apparatus 10 acquires, for example, an existing device list that is recognized and generated by a communication protocol and presents the device list to the user, and the user selects the target device from the device list presented by the device control signal registration apparatus 10. The device control signal registration apparatus 10 sets the functions of the target device selected by the user as target functions, and guides, to the user, operations of the remote controller for executing the target functions. Then, the device control signal registration apparatus 10 receives the device control signal generated as a result of the user operating the remote controller in accordance with the guidance, and transmits the device control signal to the device control signal collecting device 20.

Since the device control signal registration apparatus 10 acquires an existing device list, presents the device list to the user, and determines target functions of the target model selected by the user, the user does not need to manually set target functions and the like. That is, the user does not need to manually input the model name to register the device control signal. This enables reduction of time and labor for registration when the user intends to register a device control signal. As a result, the trouble of registering the device control signal is reduced for the user, and it can be expected that the user performs the registration work. This makes it easier to collect device control signals.

In addition, since the user does not need to manually input the device list, target functions, or the like, input errors or the like can be prevented. As a result, the accuracy of information of collected device control signals is improved.

Figure 6:
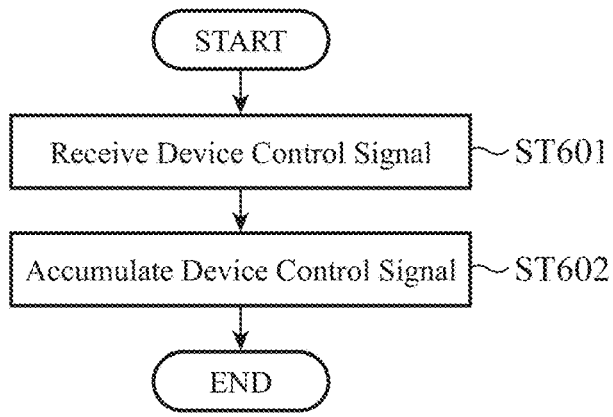
FIG. 6 is a flowchart for explaining the operation of a device control signal collecting device according to the first embodiment.

FIG. 6 is a flowchart for explaining the operation of the device control signal collecting device 20 according to the first embodiment.

The signal receiving unit 201 receives the device control signal transmitted from the signal transmission unit 108 of the device control signal registration apparatus 10 (see step ST508 in FIG. 5) (step ST601).

The signal receiving unit 201 outputs the received device control signal to the signal accumulation controlling unit 202.

In step ST601, a notification transmission unit (not illustrated) of the device control signal collecting device 20 may transmit a notification that the device control signal has been received to a notification reception unit (not illustrated) of the device control signal registration apparatus 10.

The signal accumulation controlling unit 202 stores the device control signal received by the signal receiving unit 201 in step ST601 in the device control signal DB 203 in association with information of the target device and the target model (step ST602).

At this point, the signal accumulation controlling unit 202 determines whether or not the device control signal received by the signal receiving unit 201 has already been stored in the device control signal DB 203, and in a case where it is determined that the device control signal is stored, then, information of the total number of accumulated device control signals is updated together with the device control signal.

As described above, the device control signal received by the device control signal registration apparatus 10 is transmitted to the device control signal collecting device 20 and stored in the device control signal collecting device 20.

In the above description of the device control signal registration system 1 illustrated in FIG. 1, it is assumed that the device control signal registration apparatus 10 directly receives the device control signal transmitted from the remote controller.

Without limited thereto, the device control signal registration apparatus 10 may receive the device control signal via a device control signal generating device 40 (described later) capable of intercepting the device control signal transmitted from the remote controller.

Figure 7:
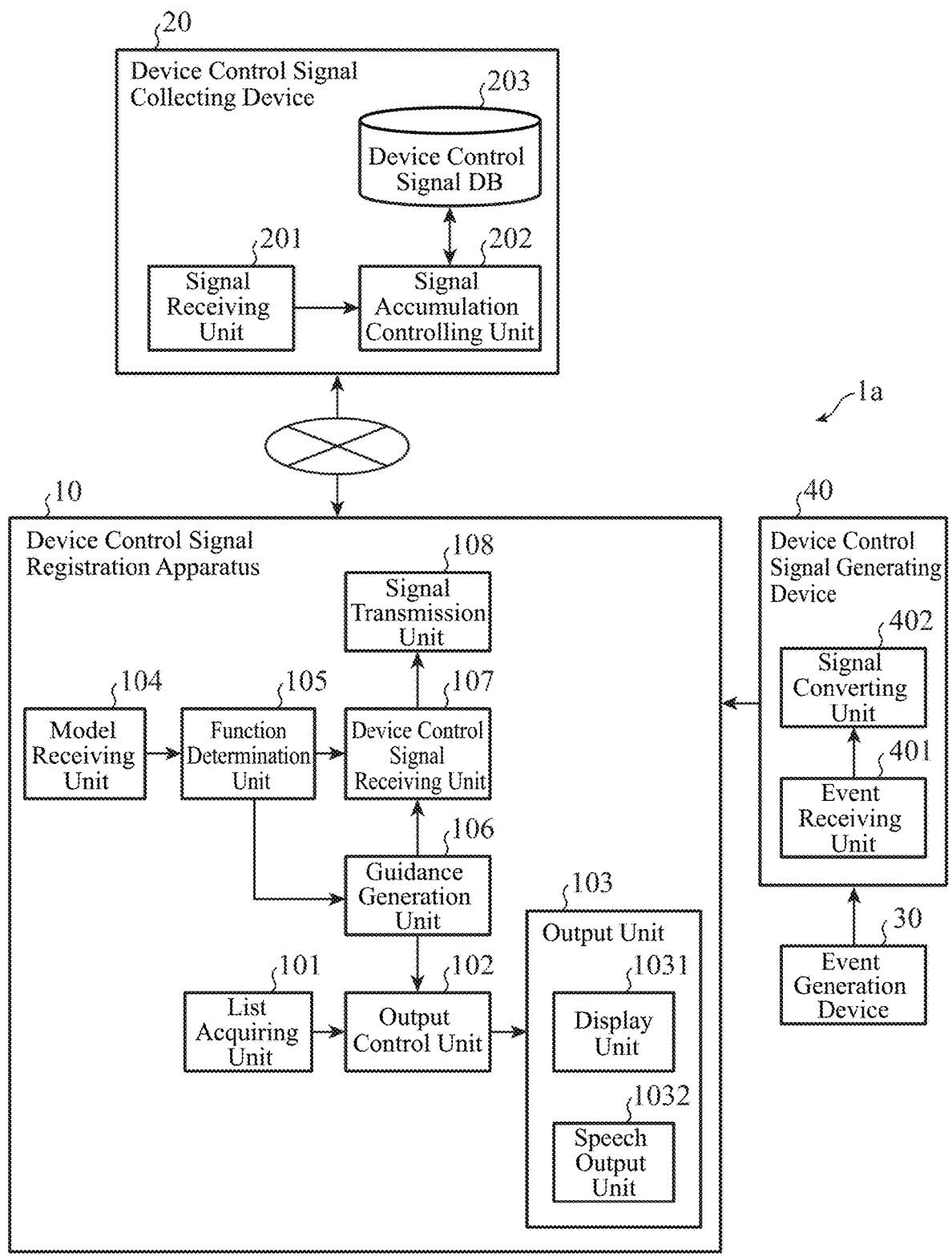
FIG. 7 is a diagram illustrating a configuration example of a device control signal registration system in a case where the device control signal registration apparatus of the device control signal registration system of the first embodiment receives a device control signal via a device control signal generating device.

FIG. 7 is a diagram illustrating a configuration example of a device control signal registration system la in a case where the device control signal registration apparatus 10 of the device control signal registration system 1 of the first embodiment receives a device control signal via a device control signal generating device 40.

The device control signal registration system 1a illustrated in FIG. 7 is different from the device control signal registration system 1 illustrated in FIG. 1 in that the device control signal generating device 40 is included. Regarding the device control signal registration system la, components similar to those of the device control signal registration system 1 described in FIG. 1 are denoted by the same symbol, and its redundant description is omitted.

In the device control signal registration system 1a, as an event generation device 30, for example, an infrared remote controller is assumed. When a button is operated, the infrared remote controller generates a device control signal and transmits the device control signal wirelessly. The device control signal transmitted by the infrared remote controller is an analog signal.

The device control signal generating device 40 receives the device control signal transmitted by the remote controller, and converts the signal into a device control signal as a digital signal. The device control signal generating device 40 transmits the device control signal to the device control signal registration apparatus 10, and the device control signal registration apparatus 10 receives the device control signal transmitted from the device control signal generating device 40.

The device control signal generating device 40 includes an event receiving unit 401 and a signal converting unit 402.

The event receiving unit 401 includes, for example, an infrared sensor, and receives the device control signal transmitted by the remote controller, and outputs the device control signal to the signal converting unit 402.

The signal converting unit 402 performs A/D conversion on the device control signal output from the event receiving unit 401 to generate a device control signal as a digital signal.

The signal converting unit 402 transmits the A/D-converted device control signal to the device control signal registration apparatus 10.

As described above, in the device control signal registration system 1a, by causing the device control signal generating device 40 to receive the device control signal from the remote controller and to transmit the device control signal to the device control signal registration apparatus 10, the device control signal can be collected for example even in a case where the device control signal registration apparatus 10 does not support infrared communication and cannot perform infrared communication with the remote controller.

The device control signal generating device 40 may further have the function of notifying that a device control signal has been received when the device control signal is received from a remote controller.

Figure 8:
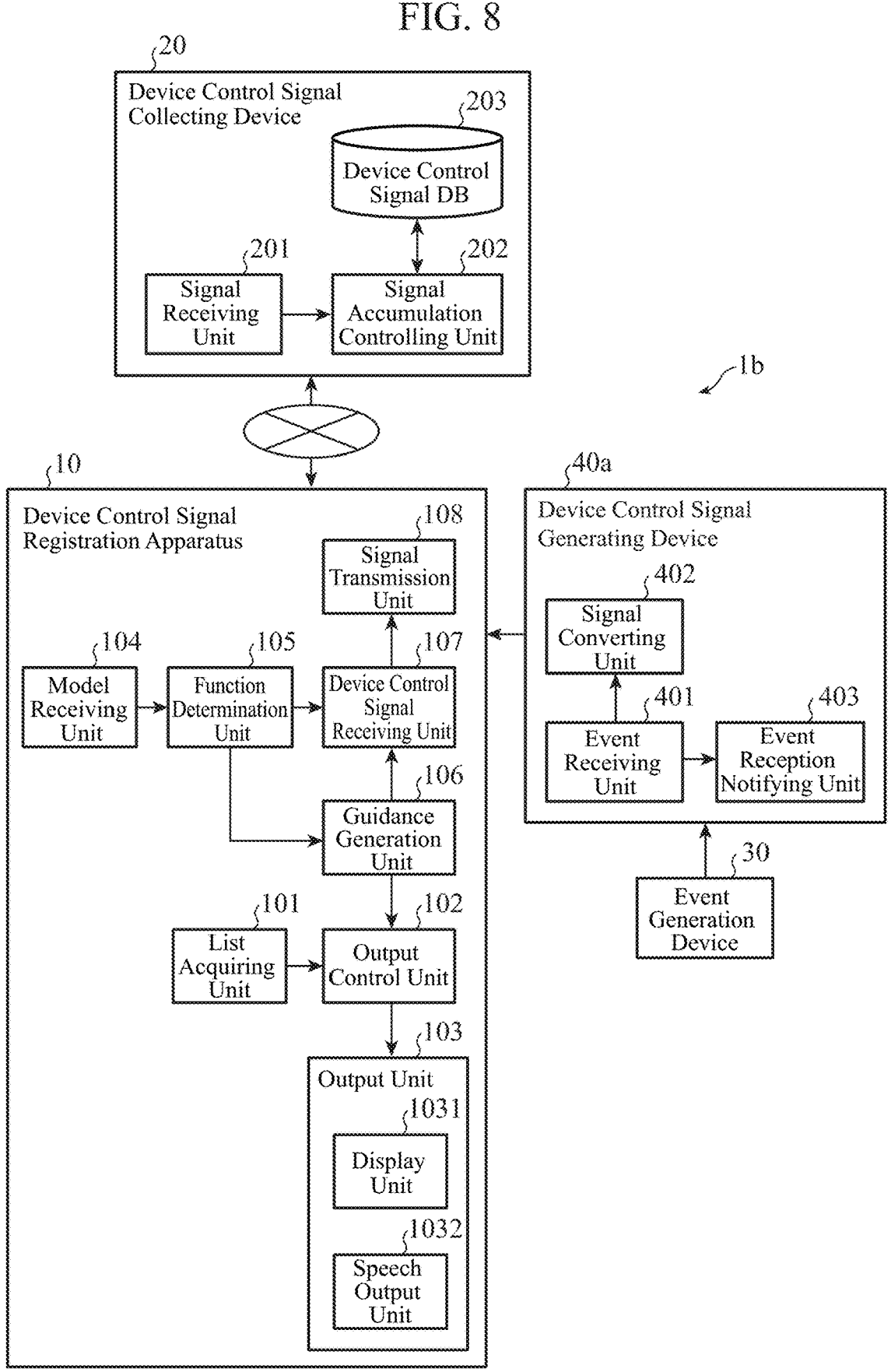
FIG. 8 is a diagram illustrating a configuration example of a device control signal registration system in a case where the device control signal registration system of the first embodiment includes a device control signal generating device and the device control signal generating device has the function of notifying that a remote control signal has been received.

FIG. 8 is a diagram illustrating a configuration example of a device control signal registration system 1b in a case where the device control signal registration system 1 of the first embodiment includes the device control signal generating device 40 and the device control signal generating device 40 is a device control signal generating device 40a having the function of notifying that a device control signal has been received from a remote controller.

The device control signal registration system 1b illustrated in FIG. 8 is different from the device control signal registration system 1a illustrated in FIG. 7 only in that the device control signal generating device 40a further includes an event reception notifying unit 403.

When receiving the device control signal from the remote controller, the event receiving unit 401 outputs the device control signal to the signal converting unit 402 and outputs the device control signal to the event reception notifying unit 403.

When the device control signal is output from the event receiving unit 401, the event reception notifying unit 403 transmits an event reception notification indicating that the device control signal has been received to a device control signal registration apparatus 10.

An event reception notification receiving unit (not illustrated) of the device control signal registration apparatus 10 receives the event reception notification transmitted from the event reception notifying unit 403.

The output control unit 102 controls so that the guidance information is displayed or output by speech in correspondence to the received event reception notification received by the event reception notification receiving unit when the display unit 1031 is caused to display guidance information or when the speech output unit 1032 is caused to output the guidance information by speech (see step ST506 in FIG. 5).

As a specific example, for example, the output control unit 102 causes the display unit 1031 to display the guidance information generated by the guidance generation unit 106 in a case where the function of "turning on the power" of the "air conditioner" of type "ABC-1234" manufactured by "Y Corp" is the target function.

Figure 9:
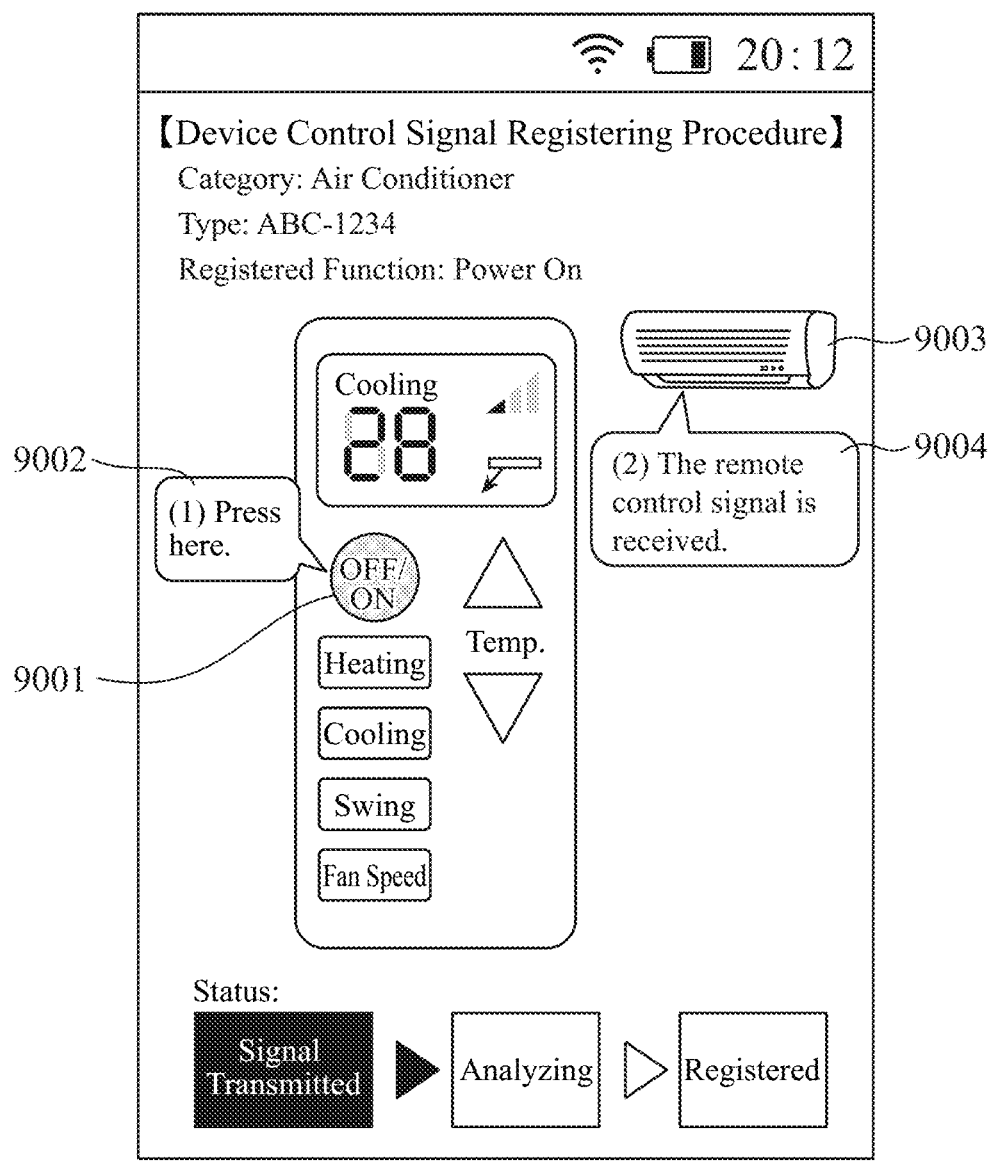
FIG. 9 is a diagram illustrating an example of a screen in which the output control unit has caused the display unit to display guidance information in response to an event reception notification in the first embodiment.

In this case, the output control unit 102 causes the display unit 1031 to first display a message "Press here" in a speech bubble pointing the image of the "Off/On" button (see 9001 in FIG. 9) to be operated by the user on the image of the remote controller as illustrated in FIG. 9 (see 9002 in FIG. 9).

Thereafter, the output control unit 102 stands by until the event reception notification receiving unit receives, from the event reception notifying unit 403 of the device control signal generating device 40a, an event reception notification indicating that the device control signal transmitted by the remote controller, with the "Off/On" button having been pressed, is received.

When the event reception notification receiving unit receives the event reception notification, the output control unit 102 causes the display unit 1031 to display a message "The remote control signal is received" in a speech bubble pointing the image of the "air conditioner" (see 9003 in FIG. 9) which is the target device to be operated by the remote controller (see 9004 in FIG. 9).

In this manner, the output control unit 102 can cause the guidance information to be displayed in correspondence to the event reception notification.

Note that, here, the output control unit 102 displays a device control signal using the expression of "remote control signal" to facilitate recognition by the user.

The output control unit 102 can also output the guidance information by speech in correspondence to the event reception notification.

FIG. 10 is a diagram illustrating a concept of an example of speech content that is output by speech in correspondence to an event reception notification by the speech output unit 1032 under the control by the output control unit 102 in the first embodiment.

Note that the concept of the speech output content denoted by 10001 in FIG. 10 corresponds to the concept of the speech output content that is output in correspondence to an event reception notification on the basis of the guidance information generated by the guidance generation unit 106 in a case where the function of "turning on the power" of the "air conditioner" of type "ABC-1234" manufactured by "Y Corp." is the target function.

As illustrated by 1001 in FIG. 10, for example, when the output control unit 102 causes the speech output unit 1032 to execute the speech output of "Press the red round button printed with Off/On on the remote controller", then the output control unit 102 stands by until the event reception notification receiving unit receives an event reception notification.

When the event reception notification receiving unit receives an event reception notification, the output control unit 102 causes the speech output unit 1032 to output the speech of "The remote control signal has been sent."

Meanwhile, the output control unit 102 can cause the speech output unit 1032 to output the speech of "Press the button again" if the event reception notification receiving unit does not receive any event reception notification for a preset time.

As described above, the output control unit 102 can cause the guidance information to be output by speech in correspondence to the event reception notification.

Note that, here, the output control unit 102 outputs a device control signal by speech using the expression of "remote control signal" to facilitate recognition by the user.

The device control signal registration apparatus 10 may include the device control signal generating device 40 or 40a described by referring to FIGS. 7 and 8, respectively.

Figure 11:
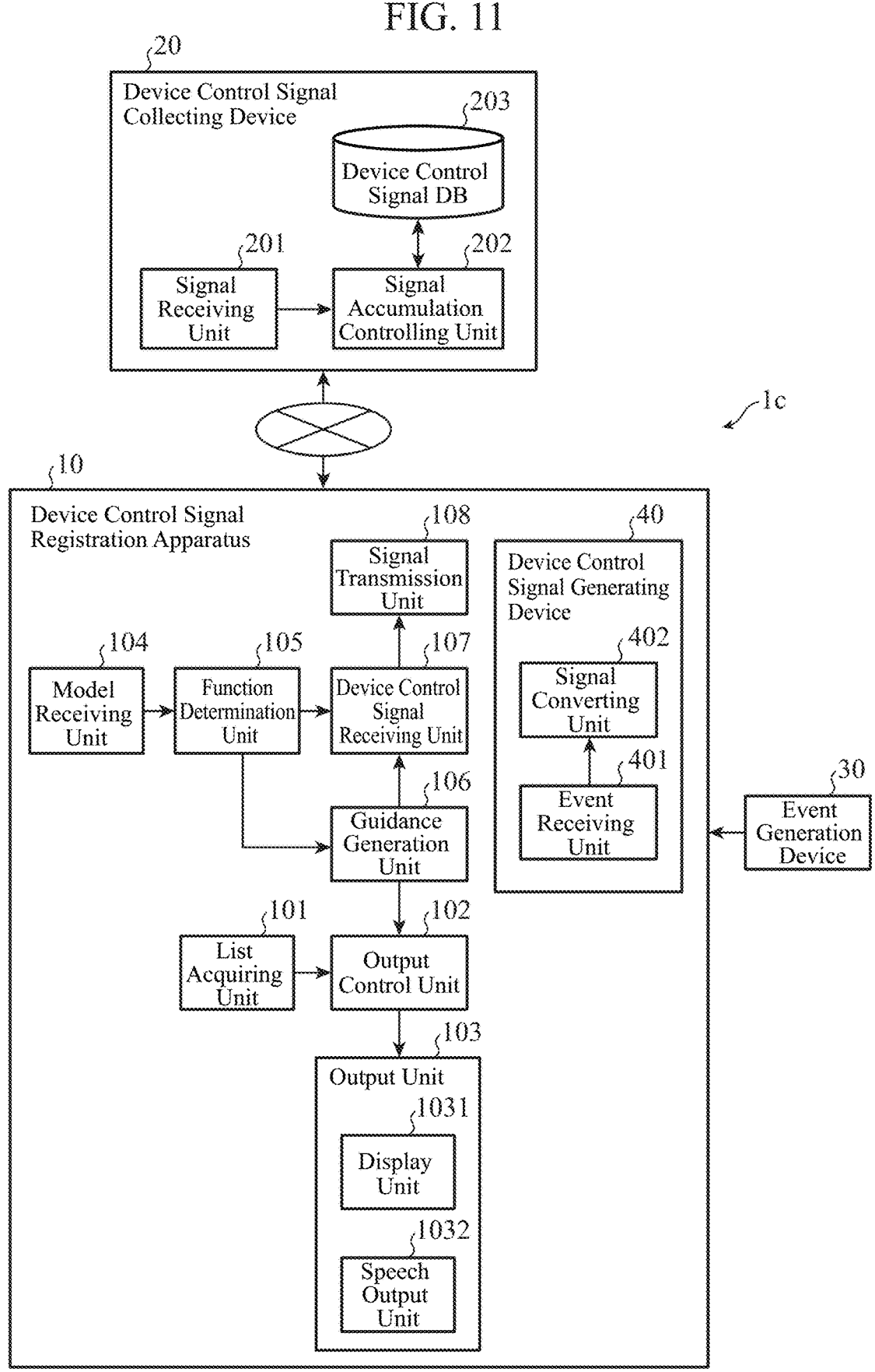
FIG. 11 is a diagram illustrating a configuration example of a device control signal registration system in which the device control signal registration apparatus of the first embodiment includes the device control signal generating device described in FIG. 7.

FIG. 11 is a diagram illustrating a configuration example of a device control signal registration system 1c in which the device control signal registration apparatus 10 of the first embodiment includes the device control signal generating device 40 described in FIG. 7.

Although an example is illustrated in FIG. 11 in which the device control signal registration apparatus 10 includes the device control signal generating device 40 described in FIG. 7, the device control signal registration apparatus 10 may include the device control signal generating device 40a described in FIG. 8.

In the above description, it is assumed that an "individual", who can be a user, operates the remote controller in accordance with the displayed guidance information or the guidance information output by speech to generate a device control signal.

However, it is not limited thereto, and for example, the remote controller may be automatically operated.

Figure 12:
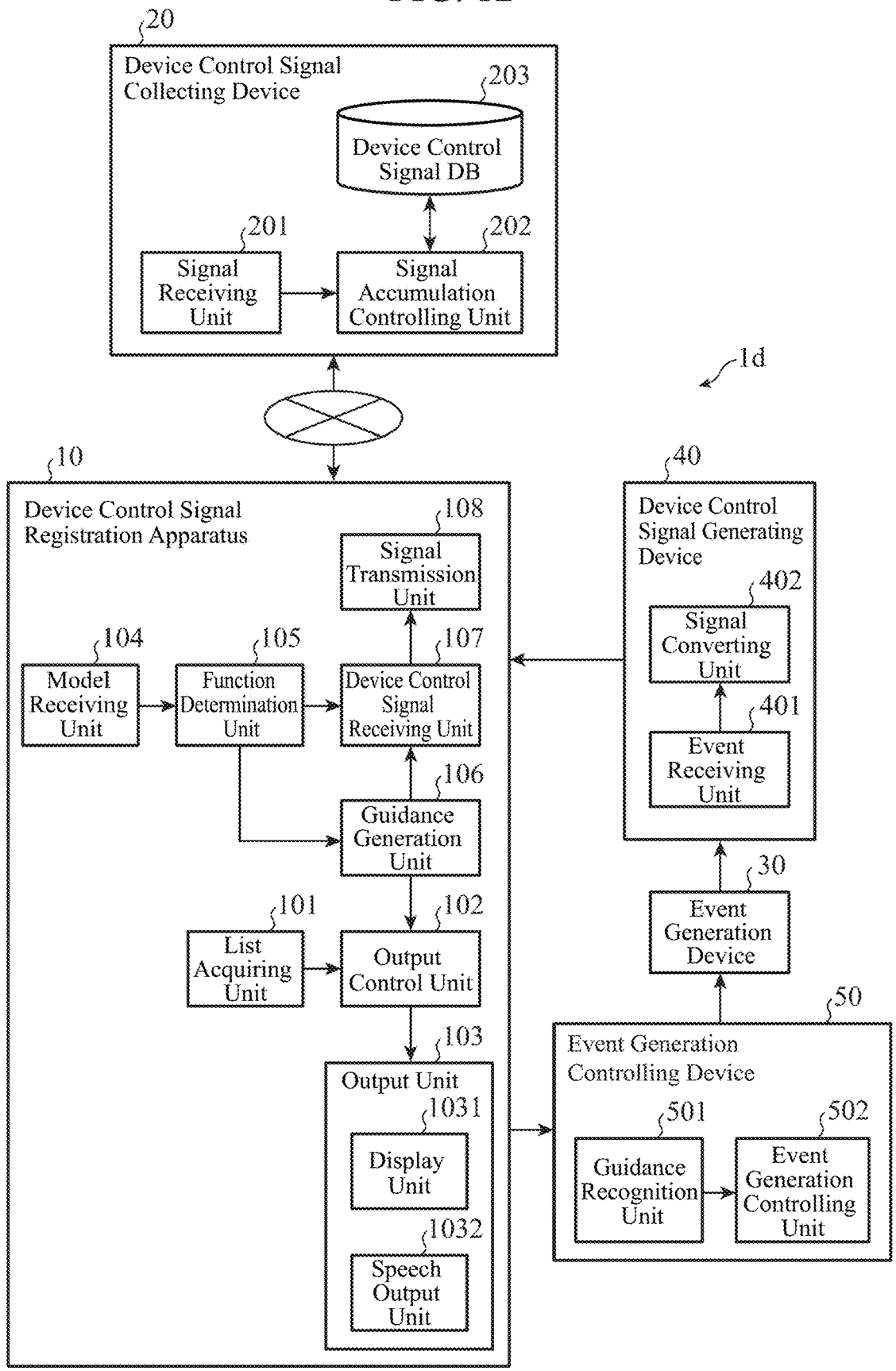
FIG. 12 is a diagram illustrating a configuration example of a device control signal registration system in which a remote controller is automatically operated in the first embodiment.

FIG. 12 is a diagram illustrating a configuration example of a device control signal registration system 1d in which a remote controller is automatically operated in the first embodiment.

The device control signal registration system 1d illustrated in FIG. 12 is different from the device control signal registration system 1a illustrated in FIG. 7 in that an event generation controlling device 50 is further included. Other components are similar to those described in the device control signal registration system 1a illustrated in FIG. 7, and thus the same symbols are given, and its redundant description is omitted.

It is assumed that the event generation controlling device 50 is, for example, a robot.

The event generation controlling device 50 includes a guidance recognition unit 501 and an event generation controlling unit 502.

The guidance recognition unit 501 recognizes the operation of the remote controller on the basis of guidance information generated by a guidance generation unit 106 of the device control signal registration apparatus 10.

Note that the guidance recognition unit 501 is only required to acquire information of the operation of the remote controller from the device control signal registration apparatus 10 and to recognize the operation of the remote controller on the basis of the acquired information.

As described above, the device control signal registration apparatus 10 can grasp, for each model of the device, by which operation of the remote controller the functions of the model are executed on the basis of function execution operation information.

The guidance recognition unit 501 outputs the information of the recognized operation of the remote controller to the event generation controlling unit 502.

The event generation controlling unit 502 causes the operation of the remote controller recognized by the guidance recognition unit 501 to be executed on the basis of the information of the remote controller operation output from the guidance recognition unit 501.

The remote controller is operated on the basis of the control by the event generation controlling device 50.

As described above, in the device control signal registration system 1d, it is also possible to allow the remote controller to be automatically operated. As a result, the user only needs to perform the operation of selecting the target model (see step ST506 in FIG. 5) upon registration of a device control signal, and there is no need to operate the remote controller in accordance with guidance information presented from the device control signal registration apparatus 10. As a result, the trouble of registering the device control signal is further reduced for the user, and it can be further expected that the user performs the registration work. This makes it further easier to collect device control signals.

Note that, in FIG. 12, the event generation controlling device 50 is further provided to the device control signal registration system 1a illustrated in FIG. 7; however, this is merely an example. The event generation controlling device 50 may be further provided to the device control signal registration systems 1b and 1c illustrated in FIG. 8 and FIG. 11, respectively. The event generation controlling device 50 may be further provided to the device control signal registration system 1 illustrated in FIG. 1.

As described above, according to the first embodiment, in the device control signal registration systems 1 to 1d, the device control signal registration apparatus 10 includes: the list acquiring unit 101 for acquiring a device list that lists models of a device having functions that can be controlled by operation of a remote controller (event generation device 30); the model receiving unit 104 for receiving information of a target model of a target device, of which device control signal generated by operation of the remote controller is to be registered, the target model of the target device selected on the basis of the device list acquired by the list acquiring unit 101; the function determination unit 105 for determining one or more target functions of the target model received by the model receiving unit 104; and the guidance generation unit 106 for generating guidance information indicating operation of the remote controller for executing the one or more target functions determined by the function determination unit 105. The device control signal transmitted from the device control signal registration apparatus 10 configured as described above is stored in the accumulation unit (device control signal DB 203) in association with information of the target device and the target model by the signal accumulation controlling unit 202 in the device control signal collecting device 20.

Therefore, the user does not need to manually set target functions or the like when registering a device control signal. That is, the user does not need to manually input the model name to register the device control signal. This enables reduction of time and labor for registration when the user intends to register a device control signal. As a result, the trouble of registering the device control signal is reduced for the user, and it can be expected that the user performs the registration work. This makes it easier to collect device control signals.

In addition, since the user does not need to manually input the device list, target functions, or the like, input errors or the like can be prevented. As a result, the accuracy of information of collected device control signals is improved.

Furthermore, according to the first embodiment, in the device control signal registration apparatus 10, the device control signal receiving unit 107 determines whether or not the received device control signal corresponds to the guidance information on the basis of the date and time when the guidance generation unit 106 has generated the guidance information, and discards the device control signal that does not correspond to the guidance information in a case where the device control signal does not correspond to the guidance information.

Therefore, it is possible to exclude a device control signal generated by operation of the remote controller that is not intended by the user to store the device control signal and to receive a device control signal generated by operation of the remote controller that is intended by the user to control the target device.

Also, in the first embodiment, the device control signal registration systems 1 to 1d can include the event receiving unit 401 for receiving a device control signal as an analog signal transmitted by the remote controller, and the device control signal generating device 40 or 40a including the signal converting unit 402 for converting the device control signal received by the event receiving unit 401 into a digital signal, and the device control signal receiving unit 107 can be configured to receive the device control signal converted by the signal converting unit 402.

Therefore, for example, even in a case where the device control signal registration apparatus 10 does not support infrared communication and cannot communicate with the remote controller, it is possible to collect device control signals for controlling the target device.

The device control signal generating device 40a includes the event reception notifying unit 403 for transmitting a notification that the device control signal has been received when the event receiving unit 401 receives the device control signal as an analog signal, and, in the device control signal registration apparatus 10, the output control unit 102 can be configured to output guidance information generated by the guidance generation unit 106 in response to an event reception notification transmitted by the event reception notifying unit 403.

Therefore, the user can confirm in real time that the operation of the remote controller has been correctly performed.

Furthermore, in the first embodiment, the device control signal registration systems 1 to 1d can further include the event generation controlling device 50 including the guidance recognition unit 501 for recognizing an operation of the remote controller and the event generation controlling unit 502 for causing execution of an operation of the remote controller recognized by the guidance recognition unit 501.

Therefore, the user only needs to perform the operation of selecting the target model upon registration of a device control signal, and there is no need to operate the remote controller in accordance with guidance information presented from the device control signal registration apparatus 10. As a result, the trouble of registering the device control signal is further reduced for the user, and it can be further expected that the user performs the registration work. This makes it further easier to collect device control signals.

Second Embodiment

In the first embodiment, the device control signal registration apparatus 10 acquires an existing device list generated by a communication protocol or the like and presents the device list to the user.

In a second embodiment, an embodiment will be described in which a device control signal registration apparatus 10 itself generates a device list and presents the device list to a user.

Figure 13:
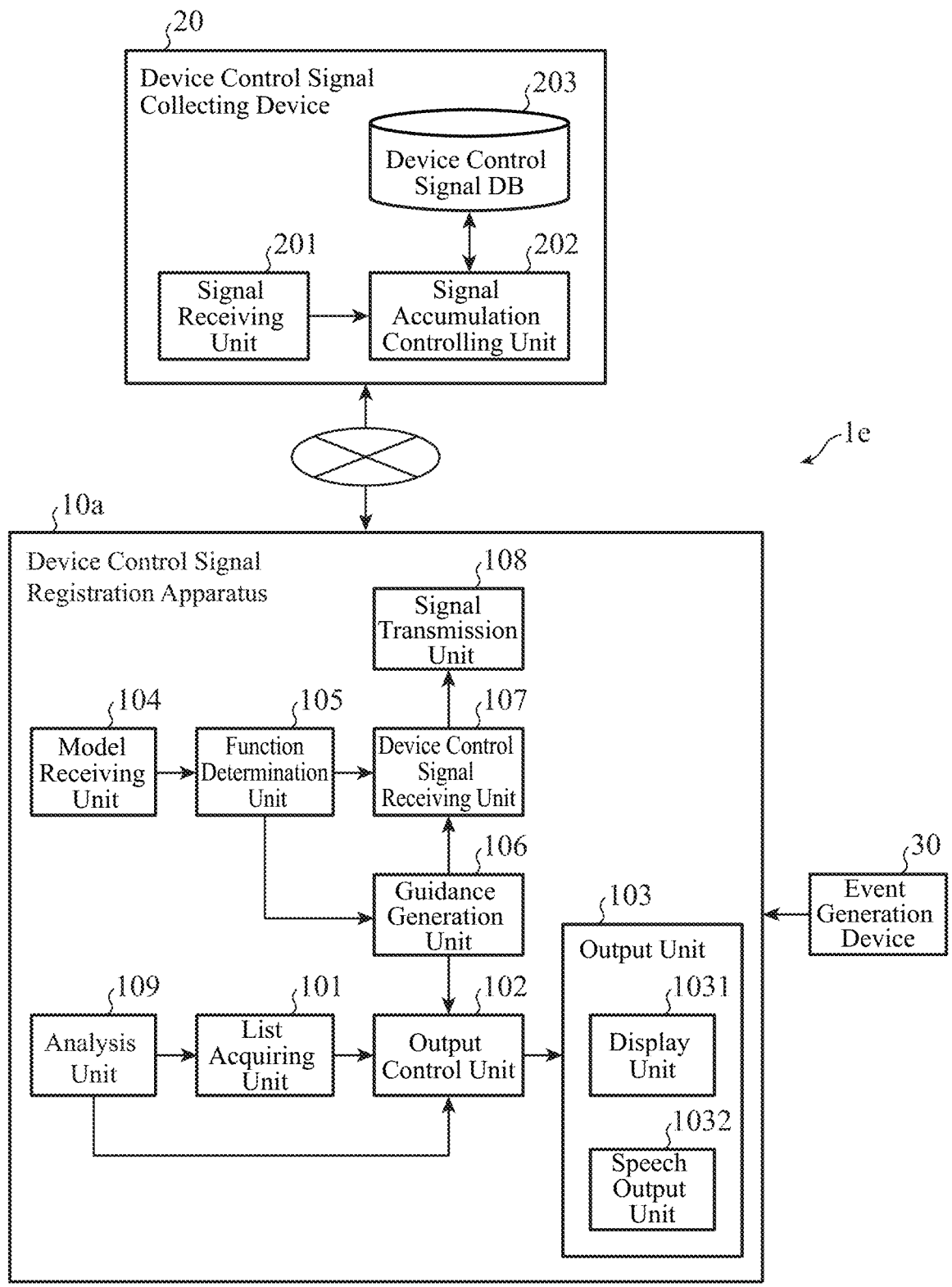
FIG. 13 is a diagram illustrating a configuration example of a device control signal registration system according to a second embodiment.

FIG. 13 is a diagram illustrating a configuration example of a device control signal registration system 1e according to the second embodiment.

In FIG. 13, components similar to those of the device control signal registration system 1 described by referring to FIG. 1 in the first embodiment are denoted by the same symbol, and its redundant description is omitted.

The device control signal registration system 1e illustrated in FIG. 13 is different from the device control signal registration system 1 described by referring to FIG. 1 in that a device control signal registration apparatus 10a includes an analysis unit 109.

Note that, here, the device control signal registration system 1e is obtained by applying the configuration of the device control signal registration apparatus 10a described below to the device control signal registration apparatus 10 of the device control signal registration system 1 described by referring to FIG. 1 in the first embodiment; however, this is merely an example. For example, the configuration of the device control signal registration apparatus 10a described below may be applied to the device control signal registration apparatus 10 of the device control signal registration systems 1a to 1d described by referring to FIGS. 7, 8, 11, and 12 in the first embodiment, respectively.

The analysis unit 109 acquires device information related to the device, analyzes the acquired device information, and generates a device list. Device information includes an image, a speech, or the like related to the device.

Specifically, for example, a user or the like photographs the device, the remote controller, or the instruction manual of the device using an imaging device such as a camera. A user or the like photographs a place where the device and the model are indicated using the imaging device. The imaging device is mounted on, for example, a mobile terminal.

The analysis unit 109 acquires the photographed image photographed by the user or the like as device information, analyzes the device information, and generates a device list. Note that the analysis unit 109 is only required to analyze the photographed image using existing image recognition technology.

Alternatively, for example, a user or the like reads out an instruction manual of the device, a model number of the device, or the like toward a speech input device such as a microphone. The speech input device is mounted on, for example, a mobile terminal.

The analysis unit 109 acquires the speech uttered by the user as device information, analyzes the device information, and generates a device list.

Further alternatively, for example, the analysis unit 109 may acquire information such as an instruction manual of the device released on the Internet as device information.

The analysis unit 109 outputs the generated device list to the list acquiring unit 101.

The list acquiring unit 101 acquires the device list generated by the analysis unit 109.

As described above, also in the case where the analysis unit 109 generates the device list, it is not necessary to manually input the model name or the like to which the device control signal correspond when the user operates the remote controller to accumulate or to update a device control signal.

The operation of the device control signal registration apparatus 10a in the device control signal registration system 1e according to the second embodiment will be described.

Note that the specific operation of the device control signal collecting device 20 in the device control signal registration system 1e is similar to the specific operation of the device control signal collecting device 20 described by referring to FIG. 6 in the first embodiment, and thus its redundant description is omitted.

Figure 14:
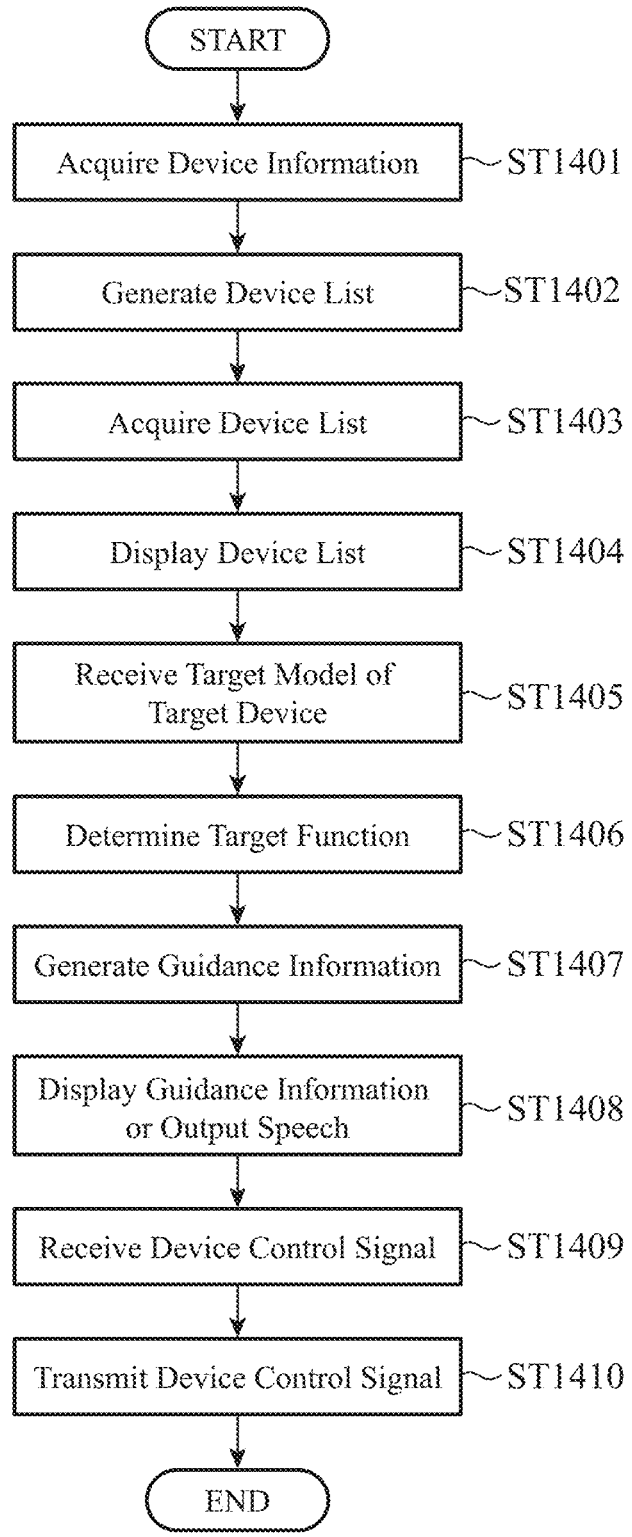
FIG. 14 is a flowchart for explaining the operation of a device control signal registration apparatus according to the second embodiment.

FIG. 14 is a flowchart for explaining the operation of the device control signal registration apparatus 10a according to the second embodiment.

The specific operations in steps ST1403 to ST1410 in FIG. 14 are similar to the specific operations in steps ST501 to ST508 in FIG. 5 described in the first embodiment, respectively, and thus its redundant description is omitted.

The analysis unit 109 acquires device information related to the device (step ST1401).

The analysis unit 109 analyzes the device information acquired in step ST1401, and generates a device list (step ST1402).

The analysis unit 109 outputs the generated device list to the list acquiring unit 101.

Note that, in the second embodiment, the analysis unit 109 may output the acquired device information to the output control unit 102, and the output control unit 102 may output information based on the device information together when the output control unit 102 causes the output unit 103 to output the guidance information generated by the guidance generation unit 106 (step ST1408).

Description will be given with a specific example.

For example, let us assume that the analysis unit 109 acquires a photographed image of a device or a remote controller as device information. In this case, the output control unit 102 can cause the display unit 1031 to display the photographed image and the guidance information in a superimposed manner.

Specifically, for example, in the case described in the first embodiment where the function of "turning on the power" of the "air conditioner" of type "ABC-01234" manufactured by "Y Corp." is the target function, the output control unit 102 can display a concept of a finger over the "Off/On" button as augmented reality (AR) on the photographed image of the remote controller of the air conditioner. When the finger image is displayed as AR over the "Off/On" button, the operation to be actually performed becomes clearer to the user.

Alternatively, for example, let us assume that the analysis unit 109 acquires information of an instruction manual of the device released on the Internet as device information. In this case, the output control unit 102 may cause the display unit 1031 to display of the operation method described in the instruction manual, or may cause the speech output unit 1032 to output a speech in which the operation method is read out.

As described above, the output control unit 102 can use the device information when causing the output unit 103 to output the guidance information.

As described above, according to the second embodiment, the device control signal registration apparatus 10a further includes the analysis unit 109 for analyzing device information related to a device and generating a device list, and the list acquiring unit 101 acquires the device list generated by the analysis unit 109.

Also, in this case, similarly to the first embodiment, the user does not need to manually set target functions or the like when registering a device control signal. That is, the user does not need to manually input the model name to register the device control signal. This enables reduction of time and labor for registration when the user intends to register a device control signal. As a result, the trouble of registering the device control signal is reduced for the user, and it can be expected that the user performs the registration work. This makes it easier to collect device control signals.

In addition, since the user does not need to manually input the device list, target functions, or the like, input errors or the like can be prevented. As a result, the accuracy of information of collected device control signals is improved.

Third Embodiment

In the first and second embodiments, the device control signal registration apparatus 10 determines all functions determined to be executable in a target model selected by a user as target functions.

In a third embodiment, an embodiment will be described in which a device control signal registration apparatus 10 determines a target function depending on the accumulation state of device control signals in a device control signal DB 203.

Figure 15:
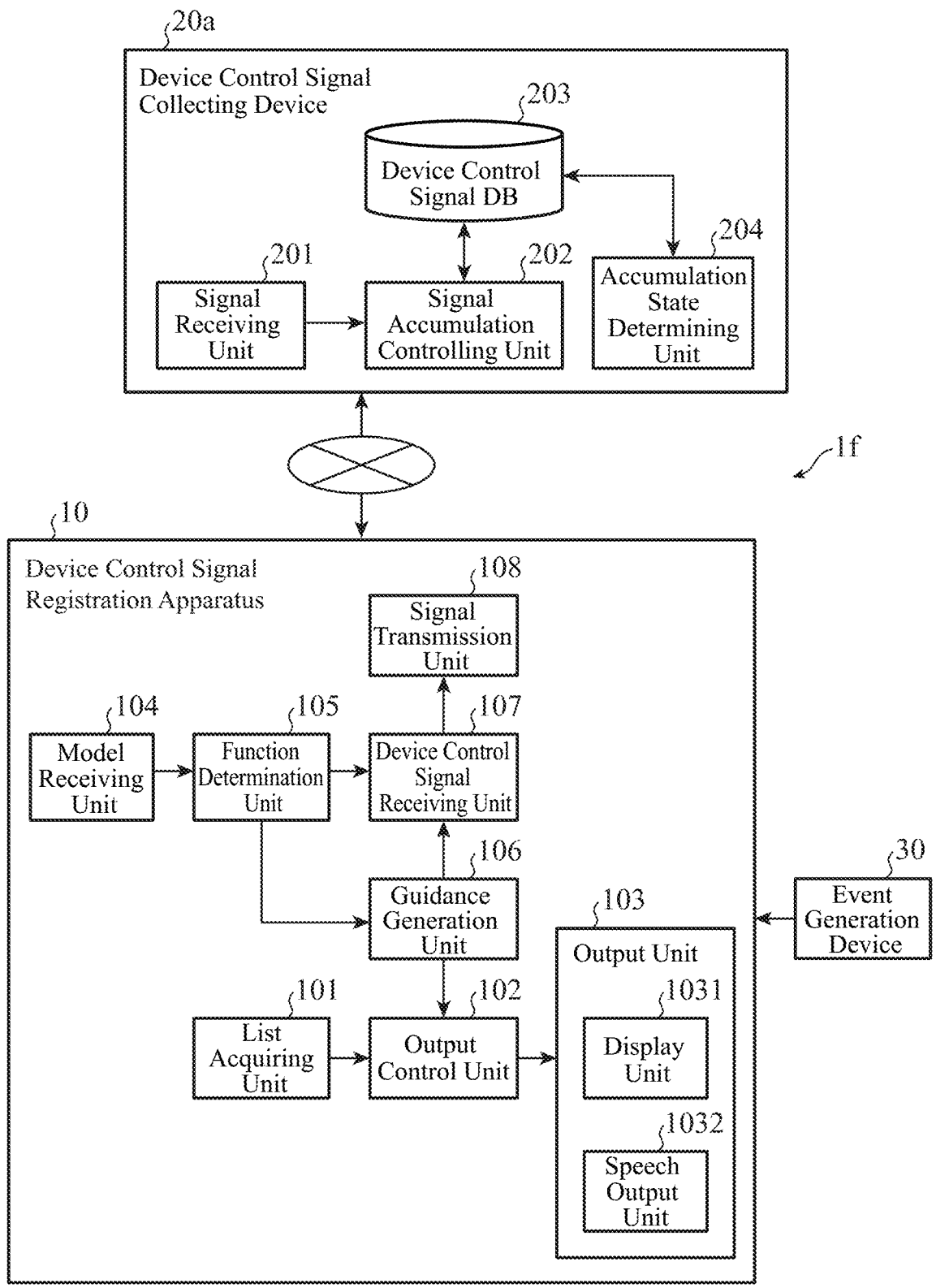
FIG. 15 is a diagram illustrating a configuration example of a device control signal registration system according to a third embodiment.

FIG. 15 is a diagram illustrating a configuration example of a device control signal registration system 1f according to the third embodiment.

In FIG. 15, components similar to those of the device control signal registration system 1 described by referring to FIG. 1 in the first embodiment are denoted by the same symbol, and its redundant description is omitted.

The device control signal registration system 1f illustrated in FIG. 15 is different from the device control signal registration system 1 described by referring to FIG. 1 in that a device control signal collecting device 20a includes an accumulation state determining unit 204.

Note that, here, the device control signal registration system 1f is obtained by applying the configuration of the device control signal collecting device 20a described below to the device control signal collecting device 20 of the device control signal registration system 1 described by referring to FIG. 1 in the first embodiment; however, this is merely an example. For example, the configuration of the device control signal collecting device 20a described below may be applied to the device control signal collecting device 20 of the device control signal registration systems 1a to 1d described by referring to FIGS. 7, 8, 11, and 12 in the first embodiment. Furthermore, the configuration of the device control signal collecting device 20a described below may be applied to the device control signal collecting device 20 described by referring to FIG. 13 in the second embodiment.

The accumulation state determining unit 204 determines the accumulation state of device control signals accumulated in a device control signal DB 203.

The conditions that the accumulation state determining unit 204 determines as the accumulation state of device control signals are set in advance. Here, for example, the accumulation state determining unit 204 determines, for each function accumulated in the device control signal DB 203, the total number of device control signals accumulated in association with the function as the accumulation state of device control signals.

The accumulation state determining unit 204 transmits device control signals, the function name, and the total number of the device control signals to the device control signal registration apparatus 10, in association with each other, as accumulation state information.

Note that a function name can be determined from a button name, pronunciation, or a displayed name.

In the device control signal registration apparatus 10, an accumulation state information receiving unit (not illustrated) receives the accumulation state information transmitted from the accumulation state determining unit 204, and outputs the received accumulation state information to a function determination unit 105.

The function determination unit 105 determines a target function on the basis of the accumulation state information.

Specifically, for example, the function determination unit 105 determines, as the target function, a function that corresponds to device control signals accumulated in the device control signal DB 203, the total number of which does not satisfy a preset threshold value, out of the functions of the target model on the basis of the accumulation state information.

For example, when a device control signal is newly stored in the device control signal DB 203, the accumulation state determining unit 204 acquires such information from the signal accumulation controlling unit 202, and determines the accumulation state. Alternatively, for example, the function determination unit 105 of the device control signal registration apparatus 10 may transmit information requesting the accumulation state information to the accumulation state determining unit 204 when the function determination unit 105 determines the target function, and the accumulation state determining unit 204 may determine the accumulation state when receiving the information.

Here, as described above, the accumulation state determining unit 204 determines the total number of device control signals as the accumulation state of the device control signals, and transmits the total number as the accumulation state information to the device control signal registration apparatus 10; however, this is merely an example.

For example, the accumulation state determining unit 204 may transmit information of the device control signals stored in the device control signal DB 203 to the device control signal registration apparatus 10 as accumulation state information. In this case, the function determination unit 105 in the device control signal registration apparatus 10, for example, determines that no further registration of device control signals is required for a function, among the functions of the target model, which corresponds to a device control signal that is already stored in the device control signal DB 203 based on the accumulation state information, and determines a function that corresponds to a device control signal not yet stored in the device control signal DB 203 as the target function.

Furthermore, for example, the accumulation state determining unit 204 may extracts, from device control signals accumulated in the device control signal DB 203, device control signals that are different from each other but are associated with the same function, and may transmit the device control signals to the device control signal registration apparatus 10 as the accumulation state information. In this case, in the device control signal registration apparatus 10, the function determination unit 105 determines, for example, a function with which different function control signals are stored in association as the target function on the basis of the accumulation state information.

For example, let us assume that function control signals "AA01" and "BB01" are stored each in association with function X in the device control signal DB 203. This may be because of, for example, erroneous operation of the remote controller by the user for executing function X in the past. In that case, for example when someone tries to use the function control signals of function X stored in the device control signal DB 203, it is difficult to determine which one of the function control signals "AA01" and "BB01" is the correct function control signal for function X.

Therefore, the function determination unit 105 determines function X as the target function. This allows more function control signals corresponding to function X to be registered, thereby facilitating determination of a more reliable function control signal in the device control signal DB.

For example, the function determination unit 105 may compare the total numbers of signals "AA01" and "BB01", and determine function X as the target function in a case where the difference between the total numbers is less than or equal to a preset threshold value. This is because it can be determined that it is easy to determine the device control signal that corresponds to function X without collecting any more device control signals if the difference between the total numbers is greater than or equal to the threshold value. Of "AA01" and "BB01", the one with an extremely small total number can be determined to be an error.

The operations of the device control signal registration apparatus 10 and the device control signal collecting device 20a in the device control signal registration system 1f according to the third embodiment will be described.

The flowchart describing the device control signal registration apparatus 10 in the device control signal registration system 1f is similar to the flowchart illustrated in FIG. 5 in the first embodiment, and thus description thereof is omitted.

The device control signal registration apparatus 10 according to the third embodiment is different from the device control signal registration apparatus 10 according to the first embodiment in the specific operation of step ST504 in FIG. 5. Specific operations of the other steps ST501 to ST503 and steps ST505 to ST508 are similar to the operations described in the first embodiment, and thus its duplicate description will be omitted.

In the third embodiment, as described above, the function determination unit 105 determines the target function on the basis of the accumulation state information transmitted from the accumulation state determining unit 204 of the device control signal collecting device 20a (step ST505).

Figure 16:
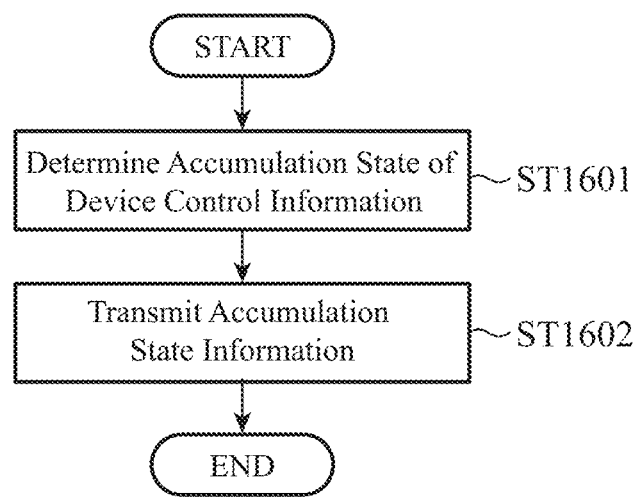
FIG. 16 is a flowchart for explaining the operation of a device control signal collecting device according to the third embodiment.

FIG. 16 is a flowchart for explaining the operation of the device control signal collecting device 20a according to the third embodiment.

The device control signal collecting device 20a according to the third embodiment performs the operation illustrated in the flowchart of FIG. 16 in addition to the operation described by referring to the flowchart of FIG. 6 in the first embodiment.

The specific operations illustrated in the flowchart of FIG. 6 have already been described in the first embodiment, and thus its duplicate description will be omitted.

The accumulation state determining unit 204 determines the accumulation state of device control signals accumulated in the device control signal DB 203 (step ST1601).

The accumulation state determining unit 204 transmits the accumulation state information to the device control signal registration apparatus 10 (step ST1602).

As described above, in the device control signal collecting device 20a, the accumulation state determining unit 204 can determine the accumulation state of device control signals, and in the device control signal registration apparatus 10, the function determination unit 105 can determine the target function on the basis of the accumulation state of the device control signals. Therefore, it is possible to narrow down to functions for registering a necessary device control signal depending on the operation and to allow a user to perform an operation for executing the function.

As described above, according to the third embodiment, the device control signal collecting device 20a includes the accumulation state determining unit 204 for determining the accumulation state of device control signals stored in the accumulation unit (device control signal DB 203), and in the device control signal registration apparatuses 10 and 10a, the function determination unit 105 determines one or more target functions on the basis of the accumulation state determined by the accumulation state determining unit 204.

Therefore, it is possible to narrow down to functions for registering a necessary device control signal depending on the operation and to allow a user to perform an operation for registering a device control signal for execution of the function.

Fourth Embodiment

In the first to third embodiments, it has been described that the device control signal collecting devices 20 and 20a store a device control signal transmitted from the device control signal registration apparatus 10 in the device control signal DB 203.

In a fourth embodiment, an embodiment will be described in which information related to a use history of device control signals accumulated in a device control signal DB 203 is extracted and output to the outside of the device.

Figure 17:
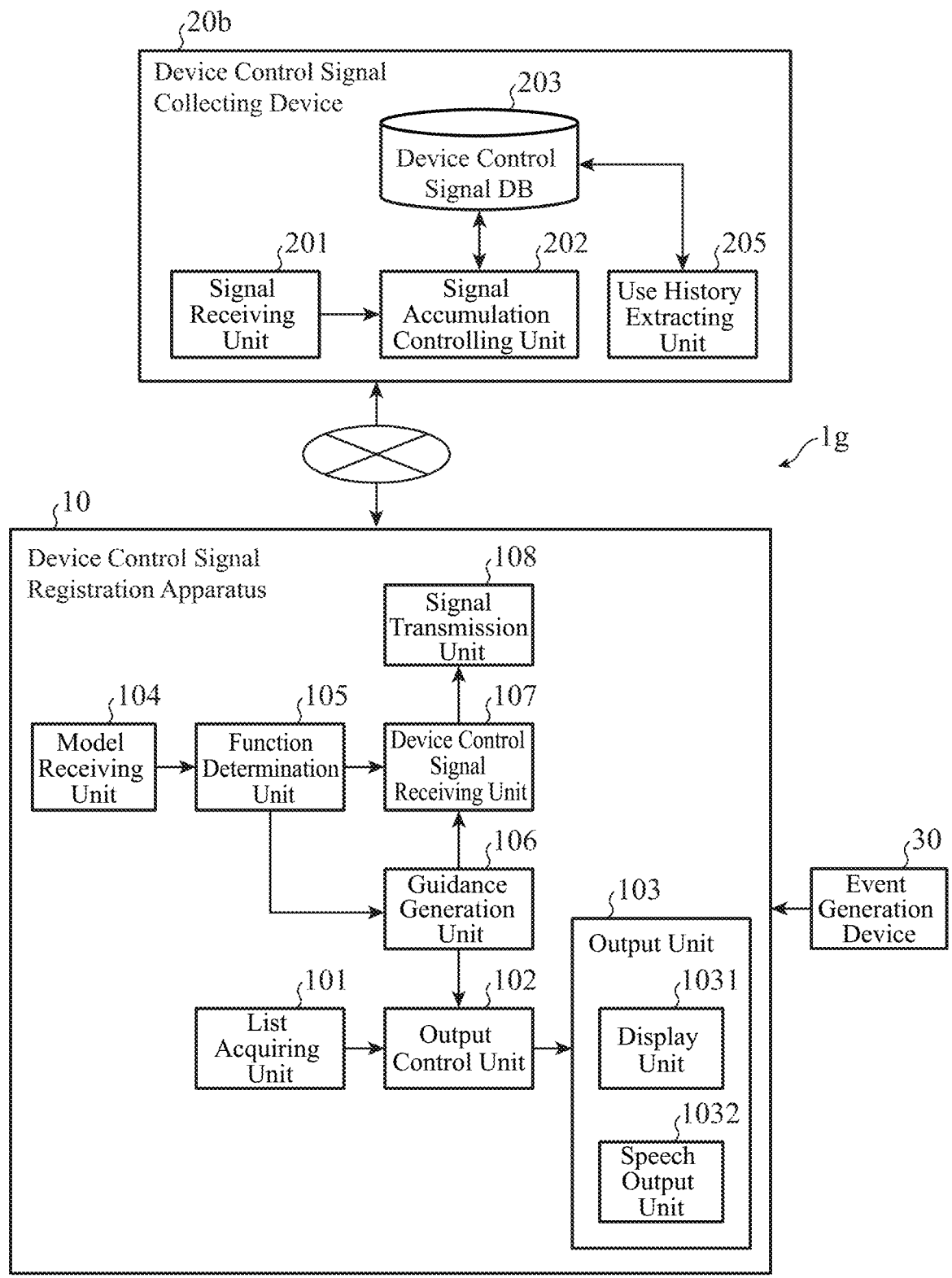
FIG. 17 is a diagram illustrating a configuration example of a device control signal registration system according to a fourth embodiment.

FIG. 17 is a diagram illustrating a configuration example of a device control signal registration system 1g according to the fourth embodiment.

In FIG. 17, components similar to those of the device control signal registration system 1 described by referring to FIG. 1 in the first embodiment are denoted by the same symbol, and its redundant description is omitted.

The device control signal registration system 1g illustrated in FIG. 17 is different from the device control signal registration system 1 described by referring to FIG. 1 in that a device control signal collecting device 20b includes a use history extracting unit 205.

Note that, here, the device control signal registration system 1g is obtained by applying the configuration of the device control signal collecting device 20b described below to the device control signal collecting device 20 of the device control signal registration system 1 described by referring to FIG. 1 in the first embodiment; however, this is merely an example. For example, the configuration of the device control signal collecting device 20b described below may be applied to the device control signal collecting device 20 of the device control signal registration systems 1a to 1d described by referring to FIGS. 7, 8, 11, and 12 in the first embodiment. Furthermore, the configuration of the device control signal collecting device 20b described below may be applied to the device control signal collecting device 20 described by referring to FIG. 13 in the second embodiment. Furthermore, the configuration of the device control signal collecting device 20b described below may be applied to the device control signal collecting device 20a described by referring to FIG. 15 in the third embodiment.

The use history extracting unit 205 outputs use information of the history of use of device control signals accumulated in a device control signal DB 203.

Specifically, for example, the use history extracting unit 205 extracts a log of access to the device control signal DB 203 during a preset period and outputs the extracted log as use information.

The use information output by the use history extracting unit 205 is used, for example, in a charging system in which a company managing the device control signal DB 203 charges an individual or a company accessing the device control signal DB 203.

The use history extracting unit 205 outputs use information when a use information request is received from, for example, a charging system in the company that manages the device control signal DB 203. Alternatively, for example, the use history extracting unit 205 may output use information at a set time every day. The use history extracting unit 205 is only required to output use information at appropriate timing.

The operation of the device control signal collecting device 20b in the device control signal registration system 1g according to the fourth embodiment will be described.

Note that the specific operation of the device control signal registration apparatus 10 in the device control signal registration system 1g is similar to the specific operation of the device control signal registration apparatus 10 described by referring to FIG. 5 in the first embodiment, and thus its redundant description is omitted.

Figure 18:
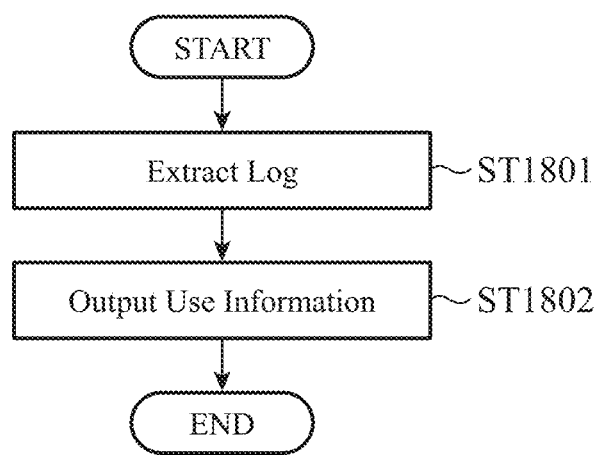
FIG. 18 is a flowchart for explaining the operation of a device control signal collecting device according to the fourth embodiment.

FIG. 18 is a flowchart for explaining the operation of the device control signal collecting device 20b according to the fourth embodiment.

The device control signal collecting device 20b according to the fourth embodiment performs the operation illustrated in the flowchart of FIG. 17 in addition to the operation described by referring to the flowchart of FIG. 6 in the first embodiment.

The specific operations illustrated in the flowchart of FIG. 6 have already been described in the first embodiment, and thus its duplicate description will be omitted.

The use history extracting unit 205 extracts a log of access to the device control signal DB 203 during a preset period (step ST1801).

The use history extracting unit 205 outputs the extracted log as use information (step ST1802).

As described above, in the device control signal collecting device 20b, the use history extracting unit 205 can output use information related to the history of access from outside of the device to the device control signal DB 203. Therefore, a company that is the administrator of the device control signal DB 203 can obtain some compensation for, for example, making the device control signal DB 203 available to other companies or the like for use of the use information.

As described above, according to the fourth embodiment, in addition to the configuration of the device control signal collecting device 20a according to the third embodiment, the device control signal collecting device 20b further includes the use history extracting unit 205 for outputting use information related to the history of use of device control signals accumulated in the accumulation unit (device control signal DB 203).

Therefore, a company that is the administrator of the device control signal DB 203 can obtain some compensation for making the device control signal DB 203 available to other companies or the like for use of the use information.

In the first to fourth embodiments above, it is assumed that the device controlled by a device control signal is a home appliance.

However, this is merely an example, and the device may be any device that can be operated by a remote controller, and the device control signal registration systems 1 to 1g are capable of collecting and accumulating device control signals for controlling the device that are generated as a result of operation of the remote controller by a user.

In the first to fourth embodiments described above, in the device control signal registration systems 1 to 1g, the device control signal registration apparatus 10 or 10a and the device control signal collecting device 20, 20a, or 20b are separate devices, and the device control signal registration apparatus 10 or 10a and the device control signal collecting device 20, 20a, or 20b are connected via a network.

Without limited thereto, the device control signal registration apparatus 10 or 10a and the device control signal collecting device 20, 20a, or 20b may be included in the same device.

Figure 19:
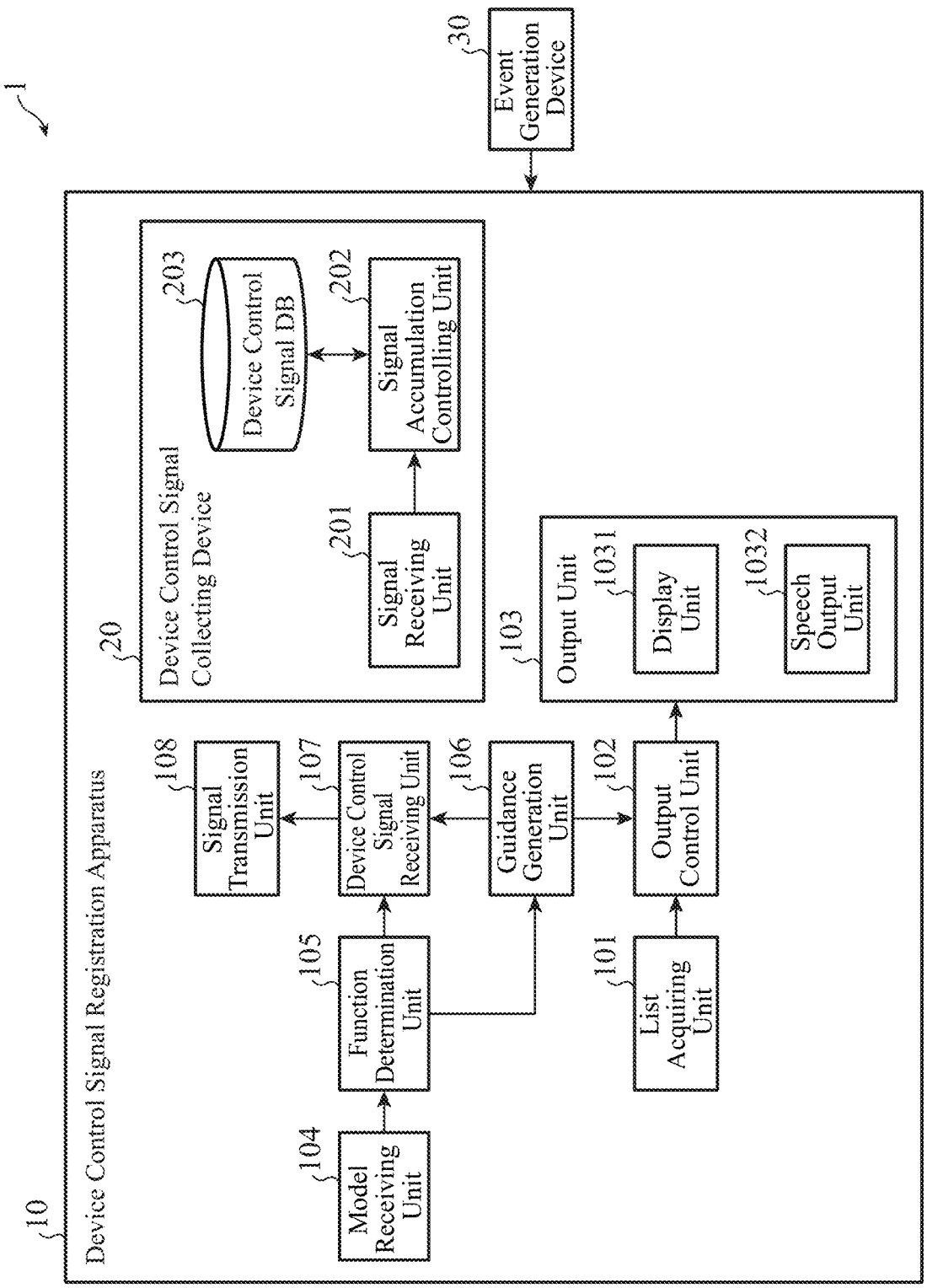
FIG. 19 is a diagram illustrating a configuration example in which the device control signal collecting device is mounted on the device control signal registration apparatus in the device control signal registration system according to the first embodiment.

FIG. 19 is a diagram illustrating a configuration example in which the device control signal collecting device 20 is mounted on the device control signal registration apparatus 10 in the device control signal registration system 1.

FIG. 19 illustrates an example in which the device control signal collecting device 20 is mounted on the device control signal registration apparatus 10 in the device control signal registration system 1 according to the first embodiment.

In the device control signal registration systems 1a to 1g according to the second to fourth embodiments, the device control signal collecting devices 20, 20a, or 20b may be mounted on the device control signal registration apparatus 10 or 10a.

In the second embodiment, in the device control signal registration system 1e, the device control signal registration apparatus 10a includes the analysis unit 109.

Figure 20:
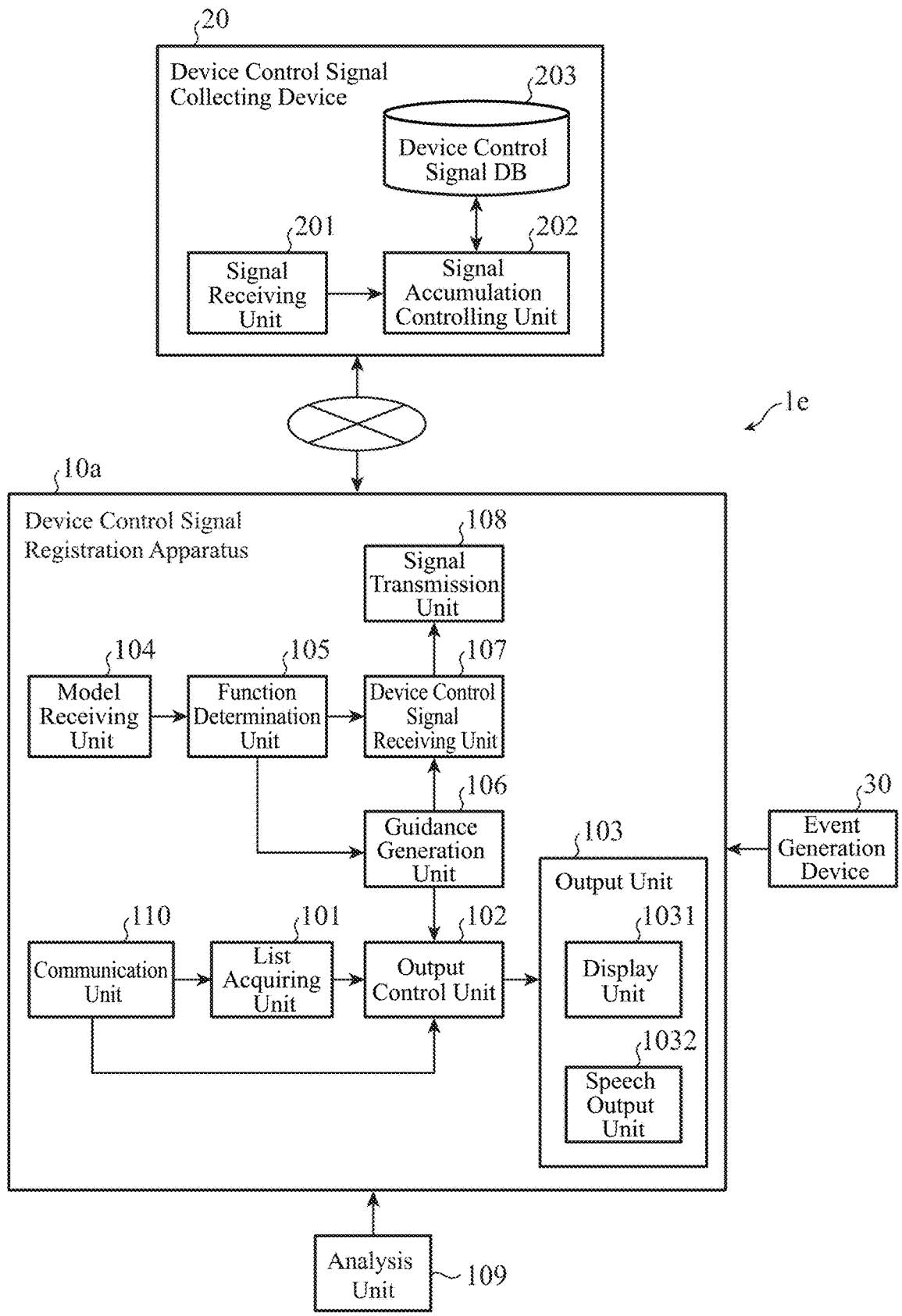
FIG. 20 is a diagram illustrating a configuration example in which an analysis unit is provided outside the device control signal registration apparatus in the device control signal registration system according to the second embodiment.

Without limited thereto, the analysis unit 109 may be, for example, on a cloud, and the communication unit 110 of the device control signal registration apparatus 10a may inquire the analysis unit 109 for device information and acquire a device list from the analysis unit 109 (see FIG. 20).

FIGS. 21A and FIG. 21B are diagrams illustrating exemplary hardware configurations of the device control signal registration apparatuses 10 and 10a and the device control signal collecting devices 20, 20a, and 20b according to the first to fourth embodiments.

The hardware configurations of the device control signal registration apparatuses 10 and 10a and the device control signal collecting devices 20, 20a, and 20b are similar, and thus will be described together.

In the first to fourth embodiments, the functions of the list acquiring unit 101, the output control unit 102, the model receiving unit 104, the function determination unit 105, the guidance generation unit 106, the device control signal receiving unit 107, the signal transmission unit 108, the analysis unit 109, the signal receiving unit 201, the signal accumulation controlling unit 202, the accumulation state determining unit 204, and the use history extracting unit 205 are implemented by a processing circuit 2101. That is, the device control signal registration apparatuses 10 and 10a each include a processing circuit 2101 for performing control for acquiring a device list and receiving a device control signal generated by operation of a remote controller for executing a target function of a target model selected by a user from the device list. Likewise, the device control signal collecting devices 20, 20a, and 20b each include a processing circuit 2101 for performing control for accumulating device control signals.

The processing circuit 2101 may be dedicated hardware as illustrated in FIG. 21A or may be a central processing unit (CPU) 2105 for executing a program stored in a memory 2106 as illustrated in FIG. 21B.

In a case where the processing circuit 2101 is dedicated hardware, the processing circuit 2101 corresponds to, for example, a single circuit, a composite circuit, a programmed processor, a parallel programmed processor, an application specific integrated circuit (ASIC), a field-programmable gate array (FPGA), or a combination thereof.

In the case where the processing circuit 2101 is the CPU 2105, each of the functions of the list acquiring unit 101, the output control unit 102, the model receiving unit 104, the function determination unit 105, the guidance generation unit 106, the device control signal receiving unit 107, the signal transmission unit 108, the analysis unit 109, the signal receiving unit 201, the signal accumulation controlling unit 202, the accumulation state determining unit 204, and the use history extracting unit 205 is implemented by software, firmware, or a combination of software and firmware. That is, the list acquiring unit 101, the output control unit 102, the model receiving unit 104, the function determination unit 105, the guidance generation unit 106, the device control signal receiving unit 107, the signal transmission unit 108, the analysis unit 109, the signal receiving unit 201, the signal accumulation controlling unit 202, the accumulation state determining unit 204, and the use history extracting unit 205 are implemented by a processing circuit such as the CPU 2105 and a system large scale integration (LSI) that executes programs stored in a hard disk drive (HDD) 2102, the memory 2106, and the like. It can also be understood that the programs stored in the HDD 2102, the memory 2106, or the like cause a computer to execute the procedures or methods of the list acquiring unit 101, the output control unit 102, the model receiving unit 104, the function determination unit 105, the guidance generation unit 106, the device control signal receiving unit 107, the signal transmission unit 108, the analysis unit 109, the signal receiving unit 201, the signal accumulation controlling unit 202, the accumulation state determining unit 204, and the use history extracting unit 205. Here, the memory 2106 may be a nonvolatile or volatile semiconductor memory such as a random access memory (RAM), a read only memory (ROM), a flash memory, an erasable programmable read only memory (EPROM), or an electrically erasable programmable read only memory (EEPROM); a magnetic disc, a flexible disc, an optical disc, a compact disc, a mini disc, a digital versatile disc (DVD), or the like.

Note that some of the functions of the list acquiring unit 101, the output control unit 102, the model receiving unit 104, the function determination unit 105, the guidance generation unit 106, the device control signal receiving unit 107, the signal transmission unit 108, and the analysis unit 109 may be implemented by dedicated hardware, and some may be implemented by software or firmware. For example, the function of the list acquiring unit 101 can be implemented by the processing circuit 2101 as dedicated hardware, and the functions of the output control unit 102, the model receiving unit 104, the function determination unit 105, the guidance generation unit 106, the device control signal receiving unit 107, the signal transmission unit 108, and the analysis unit 109 can be implemented by the processing circuit reading and executing programs stored in the memory 2106.

Some of the functions of the signal receiving unit 201, the signal accumulation controlling unit 202, the accumulation state determining unit 204, and the use history extracting unit 205 may be implemented by dedicated hardware, and some of the functions may be implemented by software or firmware. For example, the function of the signal receiving unit 201 may be implemented by the processing circuit 2101 as dedicated hardware, and the functions of the signal accumulation controlling unit 202, the accumulation state determining unit 204, and the use history extracting unit 205 may be implemented by the processing circuit reading and executing programs stored in the memory 2106.

The device control signal registration apparatuses 10 and 10a each include an input interface device 2103 and an output interface device 2104 for performing wired communication or wireless communication with devices such as the device control signal collecting devices 20, 20a and 20b, the event generation device 30, or the device control signal generating devices 40 and 40a. The communication unit 110 includes the input interface device 2103 and the output interface device 2104. The device control signal collecting devices 20, 20a, and 20beach include the input interface device 2103 and the output interface device 2104 for performing wired communication or wireless communication with devices such as the device control signal registration apparatuses 10 and 10a.

For the device control signal DB 203, the memory 2106 is used. Note that this is one example, and that the device control signal DB 203 may be implemented by the HDD 2102, a solid state drive (SSD), a DVD, or the like.

The display unit 1031 is implemented by a display device 2107.

The speech output unit 1032 is implemented by a sound output device 2108.

Various business models can be constructed using the device control signal registration systems 1 to 1g according to the first to fourth embodiments.

FIG. 22 is a diagram illustrating an example of a business model using the device control signal registration systems 1 to 1g according to the first to fourth embodiments.

Figure 22A:
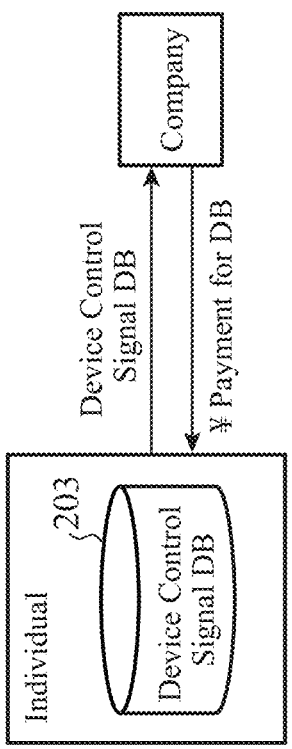
FIG. 22A and FIG. 22B are diagrams illustrating an example of a business model using the device control signal registration system according to the first to fourth embodiments.

FIG. 22A is a diagram illustrating, as an example, a concept of a business model in a case where an individual manages the device control signal registration systems 1 to 1g. In FIG. 22A, for example, a case is assumed in which a mobile terminal owned by an individual includes the device control signal registration apparatus 10 mounted with the device control signal collecting device 20 as illustrated in FIG. 19.

Figure 22B:
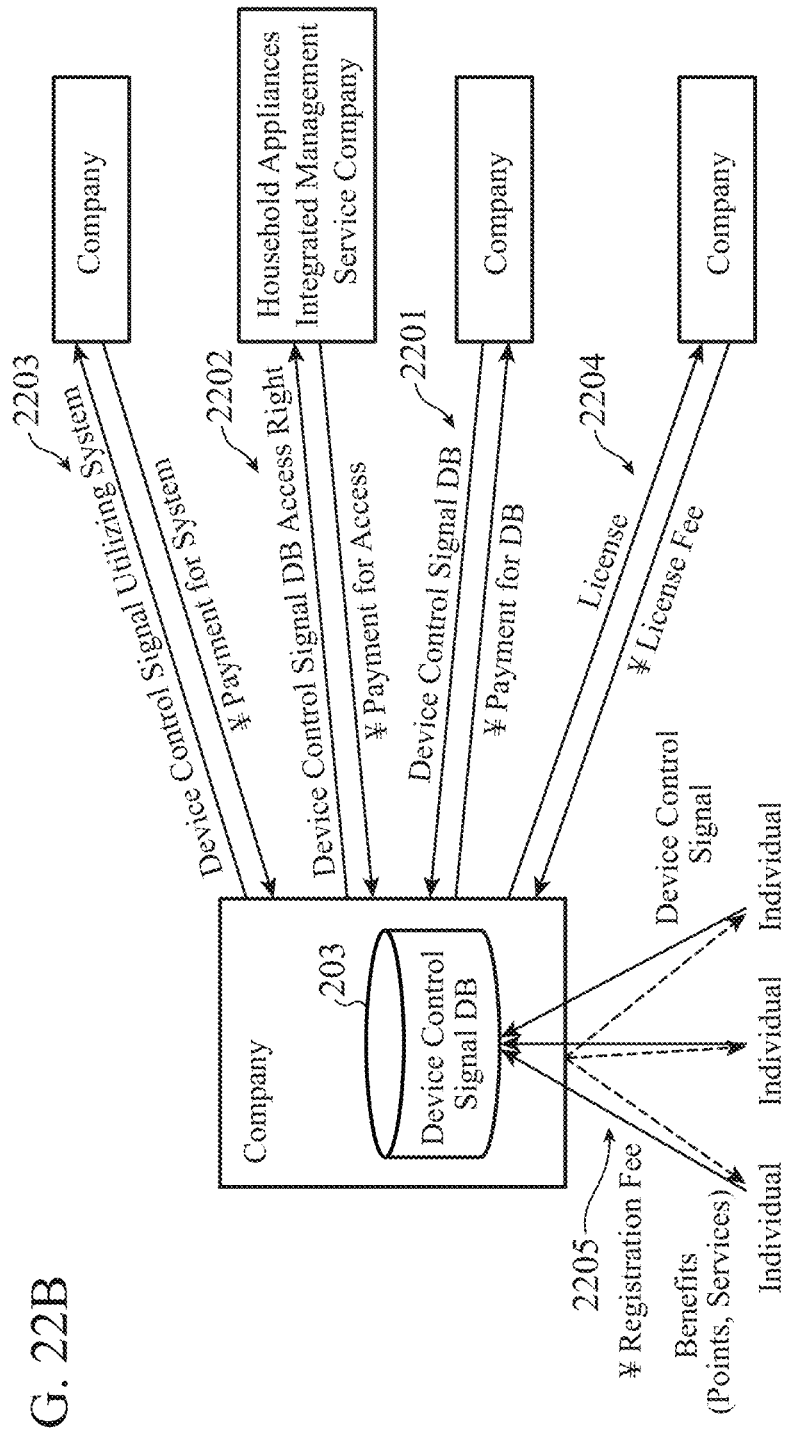

FIG. 22B is a diagram illustrating, as an example, a concept of a business model in a case where a company manages the device control signal registration systems 1 to 1g.

As illustrated in FIG. 22A, in a case where an individual manages the device control signal registration systems 1 to 1g, for example, the administrator provides the device control signal DB 203 to a company, and the company purchases the device control signal DB 203 and uses device control signals. The administrator collects the charge for the device control signal DB 203 from the company.

As illustrated in FIG. 22B, in a case where a company manages the device control signal registration systems 1 to 1g, for example, a company that owns the device control signal registration systems 1 to 1g (hereinafter referred to as the "owner company") provides the device control signal DB 203 to another company (hereinafter referred to as the "user company"), and the user company purchases the device control signal DB 203 and uses device control signals. The owner company collects the charge for the device control signal DB 203 from the user company (2201 in FIG. 22B).

Alternatively, for example, the owner company makes the device control signal DB 203 public and grants an access right to the device control signal DB 203 to the user company. The user company accesses the device control signal DB 203 and uses device control signals. Then, the owner company collects an access fee to the device control signal DB 203 from the user company (2202 in FIG. 22B).

Further alternatively, for example, the owner company provides the device control signal registration systems 1 to 1g to the user company, and the user company purchases the device control signal registration systems 1 to 1g, operates the system, and uses device control signals. The owner company collects the charge for the device control signal registration systems 1 to 1g from the user company (2203 in FIG. 22B).

Alternatively, for example, the owner company grants a license of the device control signal registration systems 1 to 1g to the user company. The user company uses device control signals by using the device control signal registration systems 1 to 1g. Then, the owner company collects a license fee for the device control signal registration systems 1 to 1g from the user company (2204 in FIG. 22B).

Meanwhile, for example, the owner company pays a registration fee to an unspecified large number of individuals (users) who have registered a device control signal. Alternatively, for example, the owner company provides benefits such as points or service to the user (2205 in FIG. 22B).

Note that the present invention may include a flexible combination of each of the embodiments, a modification of any component of the embodiments, or an omission of any component in the embodiments within the scope of the present invention.

INDUSTRIAL APPLICABILITY

A device control signal registration apparatus according to the present invention does not require manual input of a model name for registration of a device control signal when a user intends to register the device control signal for controlling a target device, and thus is applicable to a device control signal registration apparatus for collecting and registering device control signals generated by a remote controller for one or more types of devices.

REFERENCE SIGNS LIST

1 to 1g: device control signal registration system, 10, 10a: device control signal registration apparatus, 20, 20a, 20b: device control signal collecting device, 30: event generation device, 40, 40a: device control signal generating device, 50: event generation controlling device, 101: list acquiring unit, 102: output control unit, 103: output unit, 1031: display unit, 1032: speech output unit, 104: model receiving unit, 105: function determination unit, 106: guidance generation unit, 107: device control signal receiving unit, 108: signal transmission unit, 109: analysis unit, 110: communication unit, 201: signal receiving unit, 202: signal accumulation controlling unit, 203: device control signal DB, 204: accumulation state determining unit, 205: use history extracting unit, 401: event receiving unit, 402: signal converting unit, 403: event reception notifying unit, 501: guidance recognition unit, 502: event generation controlling unit, 2101: processing circuit, 2102: HDD, 2103: input interface device, 2104: output interface device, 2105: CPU, 2106: memory, 2107: display device, 2108: sound output device

The invention claimed is:

1. A device control signal registration apparatus comprising:
   processing circuitry performing a process of:
   acquiring a device list that lists models of a device having functions that are controlled by operation of a remote controller;
   receiving information of a target model of a target device, of which device control signal generated by operation of the remote controller is to be registered, the target model of the target device selected on a basis of the device list acquired;
   determining one or more target functions of the target device indicated by the information of the target model; and
   generating guidance information indicating operation of the remote controller for executing the one or more target functions determined.

2. The device control signal registration apparatus according to claim 1, wherein the processing circuitry performs the process further comprising:
   outputting the guidance information generated.

3. The device control signal registration apparatus according to claim 1, wherein the processing circuitry performs the process further comprising:
   receiving the device control signal.

4. The device control signal registration apparatus according to claim 3,
   wherein the processing circuitry performs the process further comprising:
   determining whether or not the received device control signal corresponds to the guidance information on a basis of a date and time when the process has generated the guidance information, and
   discarding the device control signal that does not correspond to the guidance information in a case where the device control signal does not correspond to the guidance information.

5. The device control signal registration apparatus according to claim 3, wherein the processing circuitry performs the process further comprising:
   storing the device control signal received in association with information related to the target device and the target model.

6. The device control signal registration apparatus according to claim 1, wherein the processing circuitry performs the process further comprising:
   receiving an analog signal indicating that the remote controller has been operated on a basis of the guidance information generated; and
   generating the device control signal obtained by converting the analog signal received into a digital signal.

7. The device control signal registration apparatus according to claim 1, wherein the processing circuitry performs the process further comprising:
   analyzing device information related to the device and generating the device list, and acquiring the device list generated.

8. The device control signal registration apparatus according to claim 7,
   wherein the processing circuitry performs the process further comprising: analyzing a photographed image of the device and generating the device list.

9. The device control signal registration apparatus according to claim 7,
   wherein the processing circuitry performs the process further comprising:
   analyzing an uttered speech related to the device and generating the device list.

10. A device control signal registration system comprising:
    a device control signal registration apparatus comprising:
    first processing circuitry performing a first process of:
    acquiring a device list that lists models of a device having functions that are controlled by operation of a remote controller;
    receiving information of a target model of a target device, of which device control signal generated by operation of the remote controller is to be registered, the target model of the target device selected on a basis of the device list acquired;
determining one or more target functions of the target device indicated by the information of the target model received;
generating guidance information indicating operation of the remote controller for executing the one or more target functions determined;
outputting the guidance information generated;
receiving the device control signal; and
transmitting the device control signal received to a device control signal collecting device; and
the device control signal collecting device comprising:
second processing circuitry performing a second process of:
receiving the device control signal transmitted; and
storing the device control signal received in association with information related to the target device and the target model.

11. The device control signal registration system according to claim 10,
wherein in the device control signal collecting device, the second processing circuitry further performs the second process comprising:
determining whether or not the device control signal received is already stored, and
in a case where it is determined that the device control signal is already stored, updating information of a total number of the device control signals accumulated, together with the device control signal.

12. The device control signal registration system according to claim 11,
wherein the second processing circuitry of the device control signal collecting device further performs the second process comprising:
determining an accumulation state of the device control signals accumulated, and
in the device control signal registration apparatus, the first processing circuitry further performs the first process comprising:
determining the one or more target functions on a basis of the accumulation state determined.

13. The device control signal registration system according to claim 12, wherein the first processing circuitry further performs the first process comprising:
determining a function, the number of the accumulated device control signals of which does not satisfy a threshold value, as the target function among functions of the target model on a basis of the accumulation state determined.

14. The device control signal registration system according to claim 10,
wherein the second processing circuitry of the device control signal collecting device further performs the second process comprising:
outputting use information of a history of use of the device control signals accumulated.

15. The device control signal registration system according to claim 10, further comprising:
an event generation controlling device comprising:
third processing circuitry performing a third process of:
recognizing operation of the remote controller; and
causing execution of the operation of the remote controller recognized.

16. A device control signal registration system comprising:

a device control signal registration apparatus comprising:
first processing circuitry performing a first process of:
acquiring a device list that lists models of a device having functions that are controlled by operation of a remote controller;
receiving a target model of a target device, of which device control signal generated by operation of the remote controller is to be registered, the target model of the target device selected on a basis of the device list acquired;
determining one or more target functions of the target model received; and
generating guidance information indicating operation of the remote controller for executing the one or more target functions determined;
outputting the guidance information generated; and
receiving the device control signal; and
a device control signal generating device comprising:
second processing circuitry performing a second process of:
receiving a device control signal as an analog signal transmitted by the remote controller; and
converting the device control signal received into a digital signal,
wherein the first process receives the device control signal having been converted.

17. The device control signal registration system according to claim 16,
wherein the second processing circuitry of the device control signal generating device further performs the second process comprising:
transmitting an event reception notification indicating that the device control signal has been received when the second process receives the device control signal as the analog signal, and
in the device control signal registration apparatus, the first processing circuitry further performs the first process comprising:
causing the guidance information generated to be output in response to the event reception notification transmitted.

18. A device control signal registration method comprising:
acquiring, by processing circuitry, a device list that lists models of a device having functions that are controlled by operation of a remote controller;
receiving, by the processing circuitry, information of a target model of a target device, of which device control signal generated by operation of the remote controller is to be registered, the target model of the target device selected on a basis of the device list acquired;
determining, by the processing circuitry, one or more target functions of the target device indicated by the information of the target model received; and
generating, by the processing circuitry, guidance information indicating operation of the remote controller for executing the one or more target functions determined.

19. The device control signal registration method according to claim 18, further comprising:
receiving, by the processing circuitry, the device control signal; and
storing, by the processing circuitry, the device control signal received in association with information related to the target device and the target model.

20. A tangible, non-transitory storing medium storing a device control signal registration program for causing a computer to execute a process of:

acquiring, by the computer, a device list that lists models of a device having functions that are controlled by operation of a remote controller;

receiving, by the computer, information of a target model of a target device, of which device control signal generated by operation of the remote controller is to be registered, the target model of the target device selected on a basis of the device list acquired;

determining, by the computer, one or more target functions of the target device indicated by the information of the target model received; and generating, by the computer, guidance information indicating operation of the remote controller for executing the one or more target functions determined.

\* \* \* \* \*